US012759731B2

(12) United States Patent
Beach et al.

(10) Patent No.: US 12,759,731 B2
(45) Date of Patent: Oct. 13, 2026

(54) ADJUSTMENT APPARATUS FOR PRECISION ALIGNMENT BETWEEN AIRCRAFT COMPONENTS

(71) Applicant: The Boeing Company, Arlington, VA (US)

(72) Inventors: Brent Austin Beach, St. Louis, MO (US); Blake Carl Kohlmeyer, Ballwin, MO (US)

(73) Assignee: The Boeing Company, Arlington, VA (US)

( * ) Notice: Subject to any disclaimer, the term of this patent is extended or adjusted under 35 U.S.C. 154(b) by 484 days.

(21) Appl. No.: 18/525,352

(22) Filed: Nov. 30, 2023

(65) Prior Publication Data

US 2025/0178751 A1 Jun. 5, 2025

(51) Int. Cl.
*G01B 5/25* (2006.01)
*B64F 5/50* (2017.01)

(52) U.S. Cl.
CPC . *B64F 5/50* (2017.01); *G01B 5/25* (2013.01)

(58) Field of Classification Search
CPC ................. B64F 5/50; B64F 5/10; G01B 5/25
See application file for complete search history.

(56) References Cited

U.S. PATENT DOCUMENTS

| | | | | |
|---|---|---|---|---|
| 4,483,080 A * | 11/1984 | Knoll | G01C 25/00 | 33/352 |
| 4,945,488 A * | 7/1990 | Carver | G05B 19/41805 | 700/182 |
| 6,810,600 B1 * | 11/2004 | Horwarth | B23Q 17/2233 | 33/645 |
| 6,855,099 B2 * | 2/2005 | Hazlehurst | B21C 51/005 | 33/286 |
| 10,676,942 B2 * | 6/2020 | Nguyen | B64F 5/00 | |
| 2025/0178751 A1 * | 6/2025 | Beach | G01B 5/25 | |
| 2025/0353613 A1 * | 11/2025 | Hill, IV | B64F 5/10 | |
| 2026/0015103 A1 * | 1/2026 | Lefloch | B64C 1/066 | |
| 2026/0028139 A1 * | 1/2026 | Spahr | B25H 1/06 | |

FOREIGN PATENT DOCUMENTS

| | | | |
|---|---|---|---|
| CN | 108622435 A * | 10/2018 | B64F 5/10 |

* cited by examiner

*Primary Examiner* — Yaritza Guadalupe-Mccall
(74) *Attorney, Agent, or Firm* — Hanley, Flight & Zimmerman, LLC

(57) ABSTRACT

Adjustment apparatus for precision alignment between aircraft components are disclosed. An example adjustor assembly includes a base including a first track and an upper housing including a second track. A slider is movably coupled relative to the first track and the second track. An actuator moves the slider in a linear direction. Movement of the slider between a first position and a second position along the first track and the second track is to cause the upper housing to move between a first operating position and a second operating position relative to the base.

20 Claims, 15 Drawing Sheets

ADJUSTMENT APPARATUS FOR PRECISION ALIGNMENT BETWEEN AIRCRAFT COMPONENTS

FIELD OF THE DISCLOSURE

This disclosure relates generally to aircraft manufacturing and, more particularly, to adjustment apparatus for precision alignment between aircraft components.

BACKGROUND

Aircraft manufacturers continue to optimize manufacturing and/or assembly processes of aircraft to increase manufacturing build times while reducing costs. However, an aircraft assembly process includes a significant amount of subassembly processes, which can affect manufacturing quality, speed and/or costs.

SUMMARY

An example adjustor assembly includes a base including a first track and an upper housing including a second track. A slider is movably coupled relative to the first track and the second track. An actuator moves the slider in a linear direction. Movement of the slider between a first position and a second position along the first track and the second track is to cause the upper housing to move between a first operating position and a second operating position relative to the base.

Another adjustor assembly includes a base, an upper housing slidably coupled to the base. A first side plate is coupled to the upper housing adjacent a first side of the upper housing, where the first side plate is to extend at least partially across the base. A second side plate is coupled to the base adjacent a second side of the base, where the second side plate to extend at least partially across the upper housing. A slider is slidably coupled to the upper housing and the base. The slider is to move in a linear direction between the first side plate and the second side plate, and an actuator to move the slider between the first side plate and the second side plate along a drive axis of the actuator. The slider is configured to cause the upper housing to move between a first operating position when the slider is in a first position adjacent the first side plate and a second operating position when the slider is in a second position adjacent the second side plate.

An example adjustor assembly includes a base defining a first track, a base plate coupled to a first side of the base, and an adjustable gib slidably coupled to the base. The adjustable gib defines a second track, the second track including a tapered profile. A gib plate is coupled to a second side of the adjustable gib opposite the first side. A slider is movably coupled to the first track and the second track between a first position and a second position, the slider including a tapered upper edge having a tapered profile that is complementary to a tapered profile of the second track. An actuator is coupled to the slider. The actuator rotatable in a first rotational direction to move the slider in a first linear direction and a second rotational direction to move the slider in a second linear direction opposite the first linear direction. Movement of the slider between the first position and the second position via the actuator causes a change of a gap between the base and the adjustable gib.

Figure 1:
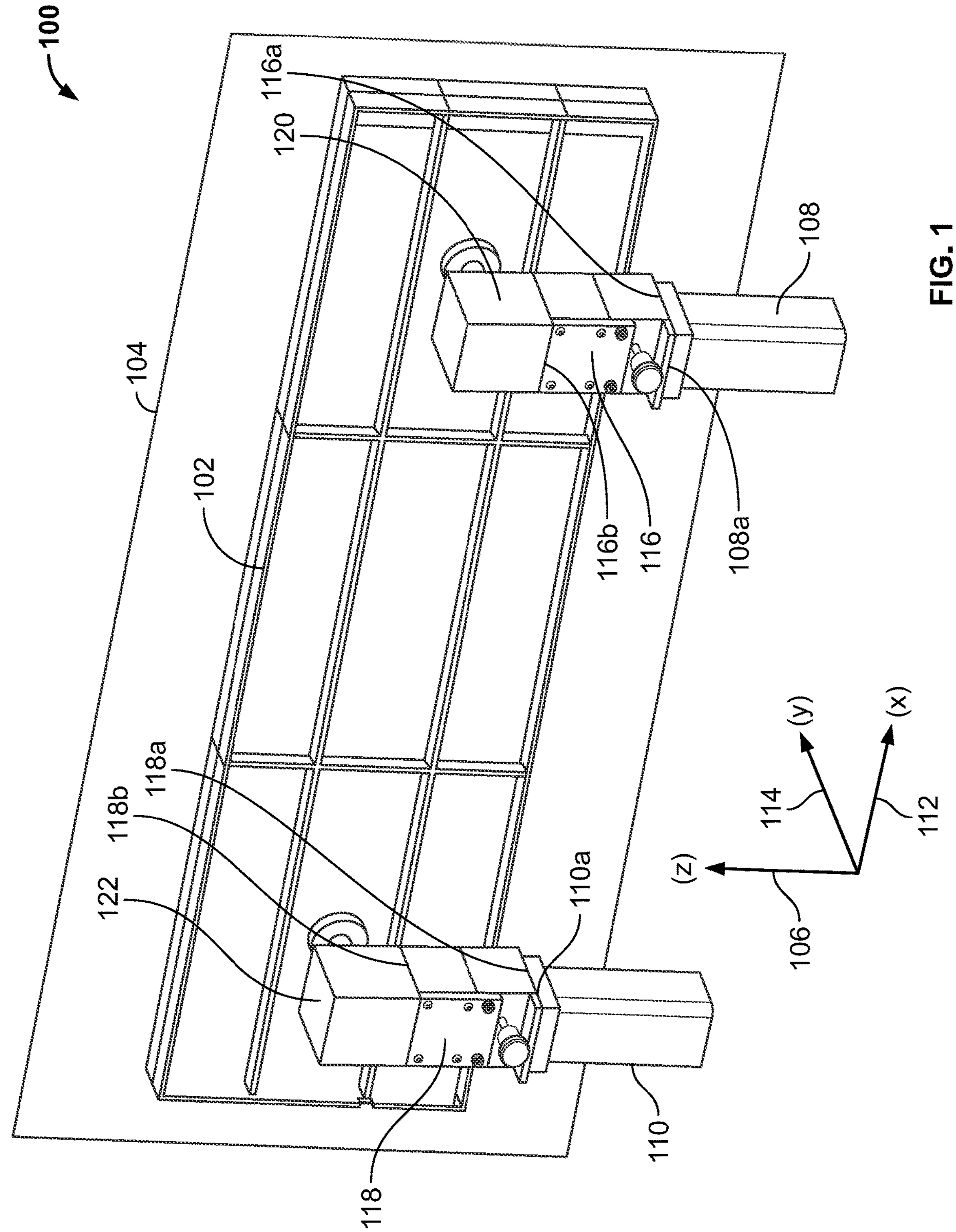
FIG. 1 is a perspective view of an example adjustment apparatus in accordance with teachings of this disclosure.

In general, the same reference numbers will be used throughout the drawing(s) and accompanying written description to refer to the same or like parts. The figures are not necessarily to scale. Instead, the thickness of the layers or regions may be enlarged in the drawings. Although the figures show layers and regions with clean lines and boundaries, some, or all of these lines and/or boundaries may be idealized. In reality, the boundaries and/or lines may be unobservable, blended, and/or irregular.

DETAILED DESCRIPTION

To improve an aircraft subassembly process, aircraft manufactures employ a Full Size Determinant Assembly (FSDA) process. An FSDA process is an aircraft assembly process that can be used to significantly reduce build time by moving drilling operations to a component fabrication process, where it is more controlled and efficient. FSDA is a manufacturing process in which part holes of two or more components are drilled precisely and accurately upon manufacture and later assembled without needing match-drilling on an aircraft assembly. This way, the assembly teams only need to align the pre-drilled holes and install fasteners, instead of drilling and removing skins multiple times. At assembly, manufacturing teams align pre-drilled holes, place fasteners and complete precise builds much faster. The FSDA process significantly reduces cycle time while also improving assembly quality and speed (e.g., can improve assembly speed by 50% or greater compared to standard processes). FSDA also improves the quality and ergonomics of the build process, as well as allowing for parallel installation of structure and subsystems.

Example adjustor apparatus disclosed herein improve and/or increase alignment accuracy between components of an aircraft during assembly. Example adjustor apparatus disclosed herein can facilitate alignment of components having pre-drilled holes. Specifically, example adjustor apparatus disclosed herein enable a fine-tune or precise adjustment of a first component relative to a second component. Some example adjustor apparatus disclosed herein enable adjustment of a first component relative to a second component in a vertical or z-direction. Example adjustor apparatus disclosed herein enable precise adjustment in a vertical direction to improve alignment precision during assembly.

FIG. 1 is a perspective view of an example adjustor apparatus 100 in accordance with teachings of this disclosure. The adjustor apparatus 100 of the illustrated example can be employed to align a position of a first component 102 (e.g., an aircraft skin or panel) relative to a position of a second component 104 (e.g., a skin or panel) in a first direction 106 (e.g., a z-direction). In some examples, the adjustor apparatus 100 of the illustrated example can be used to adjust a vertical alignment between a skin (e.g., a first component) of an aircraft relative to a frame (e.g., a second component) of an aircraft.

The adjustor apparatus 100 of the illustrated example includes a first arm 108 (e.g., a beam, a pole, etc.) and a second arm 110 (e.g., a beam, a pole, etc.) spaced from the first arm 108 in a second direction 112 (e.g., an x-direction), the second direction 112 being perpendicular to a third direction 114 (e.g., a y-direction) and the first direction 106 (e.g., the z-direction). For example, the first arm 108 is spaced from the second arm 110 in the second direction 112 (e.g., a horizontal direction in the orientation of FIG. 1). To move or adjust a position of the first component 102, the first arm 108 includes a first adjustor assembly 116 and the second arm 110 includes a second adjustor assembly 118. Additionally, to hold the first component 102, the first arm 108 includes a first part holder 120 (e.g., a fastener, a suction device, etc.) and the second arm 110 includes a second part holder 122 (e.g., a fastener, a suction device, etc.).

The first adjustor assembly 116 is positioned between the first arm 108 and the first part holder 120. For example, a first end 116*a* of the first adjustor assembly 116 is coupled to (e.g., attached, welded, etc.) to a first end 108*a* of the first arm 108 and a second end 116*b* of the first adjustor assembly 116 opposite the first end 116*a* is coupled (e.g., attached, welded, etc.) to the first part holder 120. For example, the first adjustor assembly 116 carries the first part holder 120. The second adjustor assembly 118 is positioned between the second arm 110 and the second part holder 122. For example, a first end 118*a* of the second adjustor assembly 118 is coupled to (e.g., attached, welded, etc.) to a first end 110*a* of the second arm 110 and a second end 118*b* of the second adjustor assembly 118 opposite the first end 118*a* is coupled (e.g., attached, welded, etc.) to the second part holder 122. For example, the second adjustor assembly 118 carries the second part holder 122. The first arm 108, the first adjustor assembly 116 and the first part holder 120 of the illustrated example are constructed identical to the second arm 110, the second adjustor assembly 118 and the second part holder 122. The first arm 108 and the second arm 110 can be coupled to one or more tracks, vehicles, movers, etc., to move the first arm 108 and the second arm 110 in the second direction 112 (e.g., the x-direction) and/or the third direction 114 (e.g., a y-direction) and/or a combination thereof (e.g., a diagonal direction, an x-y direction).

The adjustor apparatus 100 of the illustrated example adjusts a position of the first component 102 relative to the second component 104 in the first direction 106 (e.g., the z-direction, a vertical direction, an up/down direction, etc.) via the first adjustor assembly 116 of the first arm 108 and the second adjustor assembly 118 of the second arm 110. Specifically, the first adjustor assembly 116 adjusts a position of the first part holder 120 relative to the first arm 108 and the adjustor assembly adjusts a position of the second part holder 122 relative to the second arm 110 in the first direction 106 (e.g., a vertical or z-direction) In some examples, the adjustor apparatus 100 can adjust a position of the first component 102 relative to the second component 104 in the first direction 106 via the first adjustor assembly 116 of the first arm 108 and/or the second adjustor assembly 118 of the second arm 110 by a distance of approximately between 0.002 inches and 0.25 inches. In some examples, the first adjustor assembly 116 and the second adjustor assembly 118 can be configured to fine-tune and/or adjust the vertical and/or z-direction of the first component 102 relative to the second component 104 by any desired distance amount. In the illustrated example, the first adjustor assembly 116 operates independently from the second adjustor assembly 118. In some examples, the first adjustor assembly 116 operates in unison with the second adjustor assembly 118 via a transmission and/or a control system (e.g., a processor, combination of hardware and software, etc.). Additionally, in some examples, the adjustor apparatus 100 can include more than two arms and/or adjustment assemblies. For example, the adjustor apparatus 100 can include three arms and/or adjustor assemblies, four arms and/or adjustor assemblies, and/or any number of arms and/or adjustor assemblies.

Figure 2:
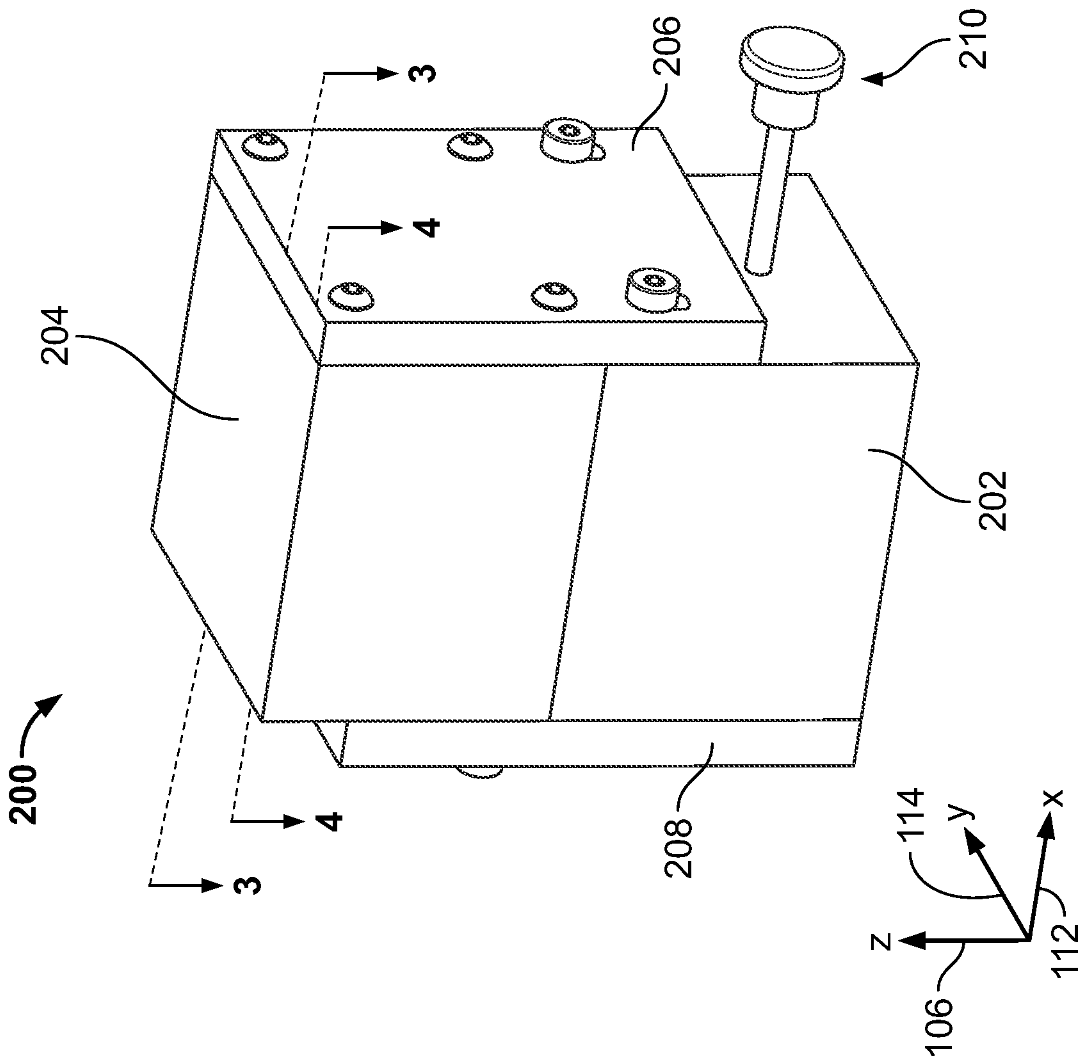
FIG. 2 is a perspective view of an adjustor assembly of the example adjustment apparatus of FIG. 1.

FIG. 2 is a perspective view of an adjustor assembly 200 disclosed herein. The adjustor assembly 200 of the illustrated example can implement the first adjustor assembly 116 and/or the second adjustor assembly 118 of FIG. 1. Specifically, the adjustor assembly 200 of FIG. 2 can be coupled to the first arm 108 and/or the second arm 110. The adjustor assembly 200 of the illustrated example includes a base 202, an upper housing 204 (e.g., an adjustable gib), an upper plate 206, a base plate 208, and an actuator 210 (e.g., a manual drive). As described in greater detail below, the actuator 210 causes movement of the upper housing 204 relative to the base 202 in the first direction 106 (e.g., z-direction).

Figure 3:
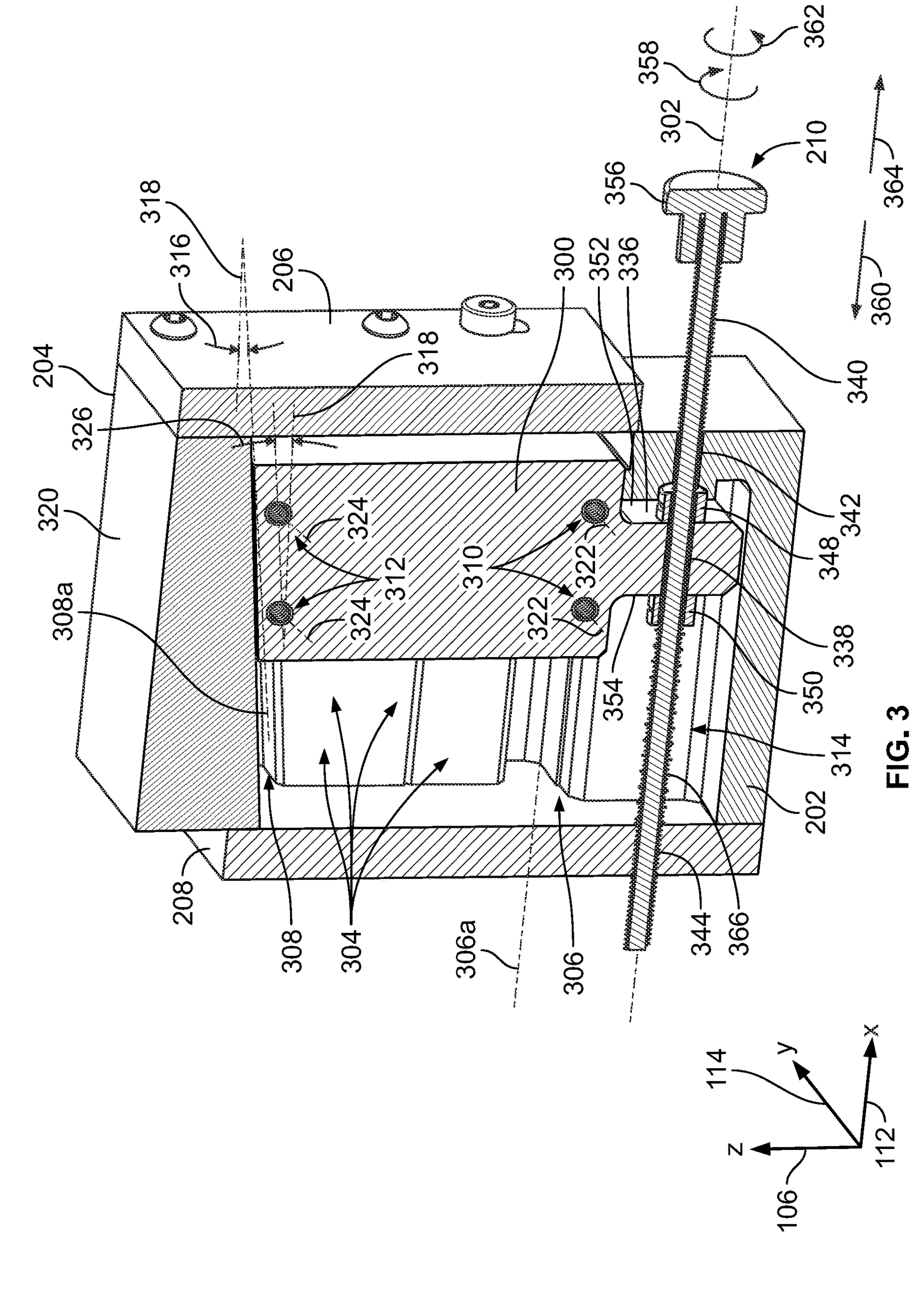
FIG. 3 is a perspective, cross-sectional view of the adjustor assembly taken along line 3-3 of FIG. 2.

FIG. 3 is a perspective, cross-sectional view of the adjustor assembly 200 taken along line 3-3 of FIG. 2. The adjustor assembly 200 includes a carriage or slider 300 (e.g., a linear slide). The slider 300 of the illustrated example is positioned (e.g., laterally) between the upper plate 206 and the base plate 208, and positioned (e.g., in a vertical direction) between the upper housing 204 and the base 202. The slider 300 of the illustrated example is moveable relative to the upper housing 204 and the base 202 in the second direction 112 (e.g., the x-direction) via the actuator 210. In other words, the slider 300 is movable relative to the upper housing 204 and/or the base 202 in a direction (e.g., a linear or lateral direction) along a linear or drive axis 302 of the actuator 210 between the upper plate 206 and the base plate 208. In response to the slider 300 moving in the second direction 112 between the upper plate 206 and the base plate 208, the slider 300 causes the upper housing 204 to move relative to the base 202 in the first direction (e.g., the z-direction).

To move in the second direction (e.g., the x-direction) via the actuator 210, the slider 300 of the illustrated example interfaces with a track system 304 of the adjustor assembly 200. The track system 304 of the illustrated example includes a first track 306 (e.g., a first rail), a second track 308 (e.g., a second rail), a first track follower 310 and a second track follower 312. In the illustrated example, the base 202 includes the first track 306, the upper housing includes the second track 308, and the slider 300 includes the first track follower 310 and the second track follower 312. Although the track system 304 of the illustrated example includes two tracks (e.g., the first track 306 and the second track 308) and two track followers (e.g., the first track follower 310 and the second track follower 212), in some examples, the adjustor assembly 200 can include one track, three tracks, four tracks or any number of tracks and/or one track follower, three track followers, four track followers and/or any number corresponding track followers.

The first track 306 is carried by the base 202. The first track 306 is formed via a cutout, channel or groove provided in a wall of the base 202. The first track 306 of the illustrated example is substantially straight. For example, the first track 306 includes a first longitudinal axis **306*a* that is substantially parallel (e.g., perfectly parallel, or almost perfectly parallel within 5 degrees) relative to the drive axis 302 of the actuator 210. The first track 306 extends laterally between the upper plate 206 and the base plate 208. The base 202 of the illustrated example includes a drive channel or cavity 314 to receive at least portions of the actuator 210. The cavity 314 of the illustrated example is positioned below the first track 306. In some examples, the base 202 of the illustrated example can include an L-shaped body, a U-shaped body, and/or any shape that provides the first track 306 and the cavity 314. In some examples, the base 202** can be a multi-part body that fastens together via fasteners, welding, etc.

The upper housing 204 of the illustrated example carries the second track 308. For example, the second track 308 is defined by a groove or cutout provided in a wall of the upper housing 204. The second track 308 of the illustrated example has a second longitudinal axis **308*a* that is non-parallel relative to the first track 306 (e.g., the first longitudinal axis 306*a* of the first track 306 and/or the drive axis 302 of the actuator 210). In the illustrated example, the second track 308 is canted, tapered, angled or sloped relative to the first track 306. For example, the second track 308 has a track angle 316 (e.g., a tapered angle) relative to horizontal 318 (e.g., the first longitudinal axis 306*a* and/or the drive axis 302). For example, the track angle 316 is approximately between 5 degrees and 30 degrees relative to horizontal 318. In some examples, the track angle 316 can be approximately between 15 degrees and 45 degrees. In some examples, the track angle 316 can be greater than 45 degrees (e.g., 60 degrees, etc.). The upper housing 204 of the illustrated example can have an L-shaped body, a U-shaped body, and/or any other shape body to provide the second track 308. The upper housing 204 has an upper surface 320 to support a part holder (e.g., the first part holder 120 or the second part holder 122 of FIG. 1) and a side wall protruding away from the upper surface 320 that includes the second track 308**.

The slider 300 of the illustrated example includes the first track follower 310 to engage the first track 306 and the second track follower 312 to engage the second track 308. The first track follower 310 of the illustrated example include a plurality of first rollers 400 (FIG. 4) having rotational axes 322 that are non-parallel (e.g., perpendicular) relative to the first longitudinal axis **306*a* of the first track 306. The first rollers 400 are positioned straight (e.g., positioned without an angle) relative to each other such that the first rollers 400 align with the first track 306. In other words, the first rollers 400** are not canted or angled relative to each other.

The second track followers 312 of the illustrated example include a plurality of second rollers 402 having rotational axes 324 that are non-parallel (e.g., perpendicular) relative to the second longitudinal axis **308*a*. Additionally, the rotational axes 324 of the second rollers 402 are at a roller angle 326 relative to horizontal 318. In this manner, the second rollers 402 align relative to the second longitudinal axis 308*a* of the second track 308. In other words, the roller angle 326 of the illustrated example is substantially similar (e.g., within 1 degree, e.g., within 5 degrees of perfectly parallel) or identical (e.g. perfectly parallel) relative to the track angle 316. The The slider 300 of the illustrated example includes an actuator interface 336 to couple to the actuator 210. The actuator interface 336 of the illustrated example includes a flange (e.g., a foot) extending from the slider 300 that moves or slides within the cavity 314 of the base 202. Additionally, the actuator interface 336 includes a slider opening 338 formed in the slider 300 (e.g., the slider flange). The slider opening 338 aligns (e.g., coaxially aligns) with the drive axis 302 of the actuator 210**.

The actuator 210 of the illustrated example includes a screw 340 (e.g., a threaded screw). The screw 340 of the illustrated example is threadably coupled to a first opening 342 of the base 202 and a second opening 344 of the base plate 208. Additionally, the screw 340 of the illustrated example is received by (e.g. slidably received by) the slider opening 338 of the slider 300. The slider opening 338 is non-threaded or is sized to provide a clearance between the screw 340 and the slider opening 338 (e.g., the slider opening 338 has a diameter greater than a diameter of the screw 340). The first opening 342, the slider opening 338, and the second opening 334 are coaxially aligned with the drive axis 302. In the illustrated example, the first opening 342 and the second opening 344 are threaded apertures and threadably receive the screw 340. In the illustrated example, the slider 300 is fixed relative to the screw 340. For example, the adjustor assembly 200 of the illustrated example includes a first clamp 348 (e.g., a first nut) and a second clamp 350 (e.g., a second nut). The first clamp 348 is coupled to the screw 340 adjacent a first side 352 of the slider 300 (e.g., a flange of the slider 300) and the second clamp 350 is coupled to the screw 340 adjacent a second side 354 of the slider 300 opposite the first side 352. The first clamp 348 is fixed to the first side 352 of the slider 300 (e.g., via a weld) and the second clamp 350 is fixed to the second side 354 of the slider 300 (e.g., via a weld). Additionally, the first clamp 348 is fixed to the screw 340 (e.g., via a weld) and the second clamp 350 is fixed to the screw 240 (e.g., via a weld). Thus, a position of the slider 300 relative to the screw 340 (e.g., in the second direction 112 or x-direction) is fixed by the first clamp 348 and the second clamp 350. Thus, rotation of the screw 340 via a knob 356 in a first rotational direction 358 (e.g., a clockwise direction) causes the screw 340 and, thus, the slider 300 to move in a first linear direction 360 (e.g., in the x-direction) along the drive axis 302 and rotation of the screw 340 is a second rotational direction 362 (e.g., a counterclockwise direction) opposite the first rotational direction 358 causes the screw 340 and, thus, the slider 300 to move in a second linear direction 364 (e.g., in the x-direction) along the drive axis 302 opposite the first linear direction 360. A lead or pitch of external threads of the screw 340 can be configured to provide a distance that the slider 300 moves per degree of rotation of the screw 340.

The pitch of the external thread of the screw can be provided based on a desired accuracy and/or precision of the adjustor assembly 200. In some examples, the actuator 210 can be a linear drive that includes a track and rail system to enable movement of the slider 300 along the drive axis 302 and/or any other drive or mechanism for converting rotational motion of the actuator 210 into linear motion of the slider 300.

In the illustrated example, the actuator 210 includes a biasing element 366 (e.g., a coil spring, a spring) positioned between the second clamp 350 and an inner surface of the base plate 208. The biasing element 366 is coaxially aligned with the drive axis 302 and provides tension against the slider 300. Specifically, the biasing element 366 provides tension against gravity to maintain an orientation of the slider 300 in an upright direction or position as the slider 300 moves in the along the drive axis 302. For instance, the biasing element 366 can reduce or prevent instances of canting (e.g., relative to vertical) between the first track follower 310 (e.g., the first rollers 400) and the first track 306 and/or the second track follower 312 (e.g., the second rollers 402) and the second track 308. Such canting may affect an accuracy or precision of an adjustment position and/or can increase friction during movement of the slider 300 along the drive axis 302. In some examples, the biasing element 366 can be omitted.

Figure 4:
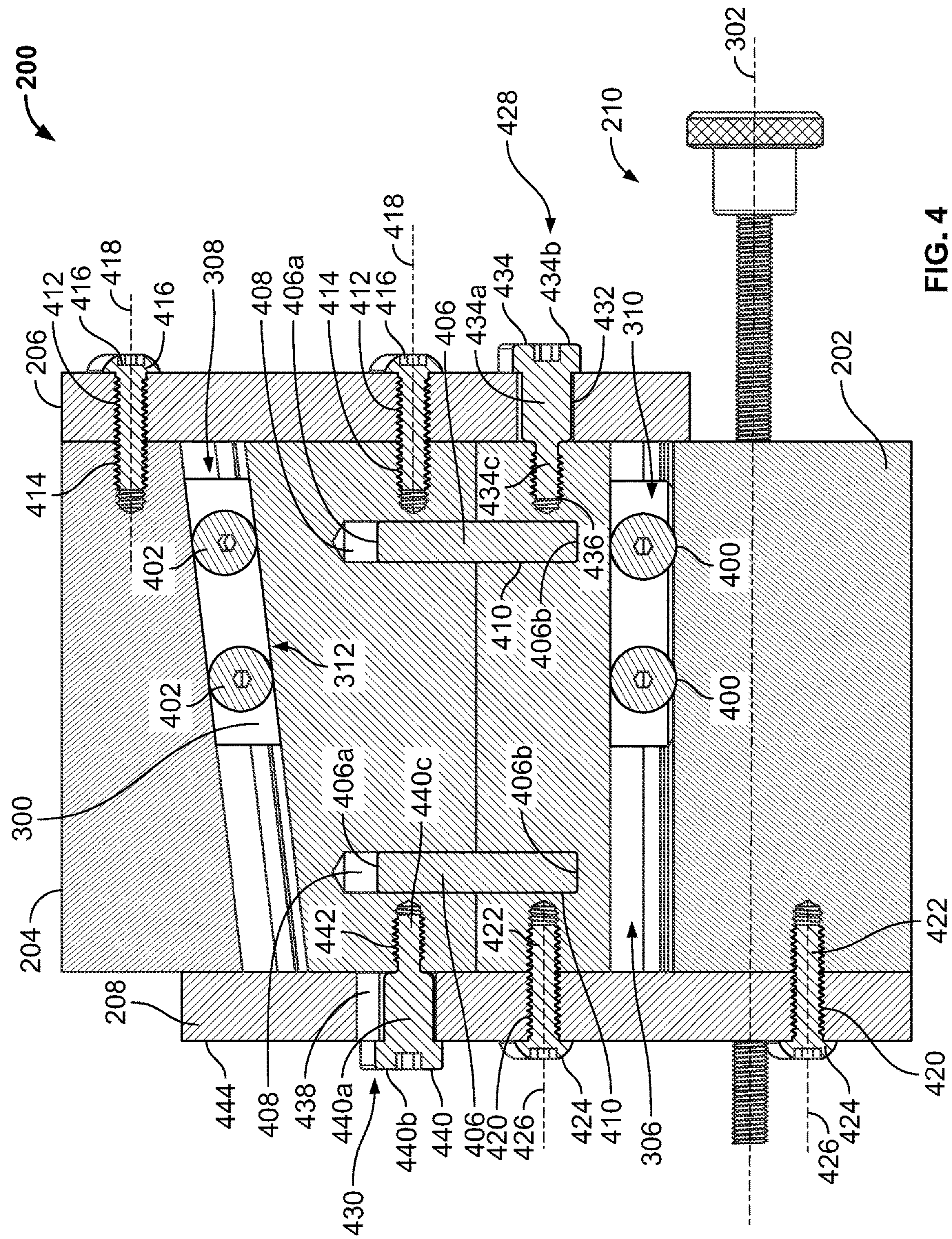
FIG. 4 is a front cross-sectional view of the example adjustor assembly taken along line 4-4 of FIG. 2.

FIG. 4 is a cross-sectional view of the adjustor assembly 200 taken along line 4-4 of FIG. 2. The first track follower 310 of the illustrated example includes the plurality of first rollers 400 and the second track follower 312 of the illustrated example includes the plurality of second rollers 402. In the illustrated example the first rollers 400 engage the first track 306 and the second rollers 402 engage the second track 308. In some examples, the first track follower 310 can be a first roller (e.g., a single roller positioned between the first rollers 400 of FIG. 4) that interfaces or engages the first track 306 and the second track follower 312 can be a second roller (e.g., a single roller positioned between the second rollers 402 of FIG. 4) that interfaces or engages the second track 308. In some examples, the first track follower 310 and/or the second track follower 312 can be bearings, slide bearings, a slide strip, a rail and/or another structure to enable the slider 300 to move relative to the upper housing 204 and the base 202 in a linear direction along the drive axis 302. In some examples, the first rollers 400 and/or the second rollers 402 can support a load imparted to the adjustor assembly 200 when a part is coupled to the adjustment assembly 100 of FIG. 1.

Referring to FIG. 4, the upper housing 204 is coupled to the base 202 via a plurality of pins 406 (e.g., dowel pins). Specifically, the upper housing 204 includes first apertures 408 for receiving first ends **406*a* of the pins 404 and the base 202 includes second apertures 410 for receiving second ends 406*b* of the pins 406. In the illustrated example, the pins 406 are slidably coupled to the first apertures 408 and fixed relative to the second apertures 410. In particular, the first ends 406*a* of the pins 406 are slip fit relative to the first apertures 408 of the upper housing 204. The second ends 406*b* of the pins 406 are press fit relative to the second apertures 410 of the base 202. In this manner, the upper housing 204 can move (e.g., slide) relative to the first ends 406*a* of the pins 406 and/or the base 202 (e.g., in the first direction 106) even though the first ends 406*a* of the pins 406 are positioned in the first apertures 408. Although the upper housing 204 can move relative to the pins 406 and/or the base 202, the first ends 406*a* of the pins 406 remain within the first apertures 408 as the upper housing 204 moves between a first position (e.g. a maximum vertical distance) and a second position (e.g., a minimum vertical distance) as the slider 300 moves in an aft/fore direction along the drive axis 302 between the upper plate 206 and the base plate 208. The pins 406 remain fixed to the base 202 (e.g., the pins 406 do not move) when the upper housing 204 moves relative to the base 202 and/or the pins 406**.

The upper plate 206 includes a plurality of upper plate apertures 412 (e.g., threaded apertures). The upper plate apertures 412 of the upper plate 206 and corresponding upper housing apertures 414 (e.g., threaded apertures) receive upper plate fasteners 416 to couple (e.g., fix or attach) the upper plate 206 and the upper housing 204. For example, the upper plate fasteners 416 have longitudinal axes 418 (e.g., or shafts) that are substantially parallel relative to the drive axis 302. In some examples, the longitudinal axes 418 of the upper plate fasteners 416 can be non-parallel (e.g., at a 45 degree angle) relative to the drive axis 302. The upper plate apertures 412 of the illustrated example are threaded apertures and the upper plate fasteners 416 are threaded screws or bolts. Thus, the upper plate fasteners fix or couple the upper plate 206 and the upper housing 204.

Similarly, the base plate 208 includes a plurality of base plate apertures 420 (e.g., threaded apertures). The base plate apertures 420 of the base plate 208 and corresponding base apertures 422 (e.g., threaded apertures) of the base 202 receive base plate fasteners 424 to couple (e.g., fix or attach) the base plate 208 and the base 202. For example, the base plate fasteners 424 have longitudinal axes 426 (e.g., or shafts) that are substantially parallel relative to the drive axis 302. In some examples, the longitudinal axes 426 of the base plate fasteners 424 can be non-parallel (e.g., at a 45 degree angle) relative to the drive axis 302. The base plate apertures 420 of the illustrated example are threaded apertures and the base plate fasteners 424 are threaded screws or bolts. The base plate fasteners 424 fix the base plate 208 and the base 202.

The adjustor assembly 200 of the illustrated example includes a first stop 428 and a second stop 430. The first stop 428 interacts with the upper plate 206 and the second stop 430 interacts with the base plate 208. The first stop 428 and the second stop 430 of the illustrated example work limit movement (e.g., vertical movement or movement in the z-direction) or provide travel ends of the upper housing 204 relative to the base 202 when the upper housing 204 moves between a fully upward position (e.g., FIG. 7) and fully downward position (e.g., FIG. 5).

The first stop 428 of the illustrated example includes an upper plate slot 432 formed in the upper plate 206 and a first shoulder bolt 434. Specifically, the upper plate 206 at least partially extends across a portion of the base 202. In the illustrated example, the first shoulder bolt 434 is threadably coupled to a base aperture 436 of the base 202 that aligns with the upper plate slot 432 of the upper plate 206. A first shank portion **434*a* of the first shoulder bolt 434 is positioned in the upper plate slot 432, a first head 434*b* of the first shoulder bolt 434 engages an outer surface of the upper plate 206, and a threaded end of the first shoulder bolt 434 threadably engages the base aperture 436 of the base 202. Thus, the upper plate slot 432 of the illustrated example receives the first shank portion 434*a*. The upper plate slot 432 has a size (e.g., a distance, a diameter, an opening, etc.) that is greater than a diameter or size of the first shank portion 434*a* of the first shoulder bolt 434. For example, the upper plate 206 can slide or move in the first direction 106** (e.g., a vertical direction) relative to the first shoulder bolt 434 when the upper housing 204 moves between a fully upward position (e.g., FIG. 7) and a fully lowered position (e.g., FIG. 5). The upper plate slot 432 of the illustrated example is positioned below the upper plate fasteners 416 of the upper plate 206. Additionally, although the cross-sectional view of FIG. 4 shows two apertures and a slot, the upper plate 206 of the illustrated example includes four apertures and two slots as shown in FIG. 1.

Figure 5:
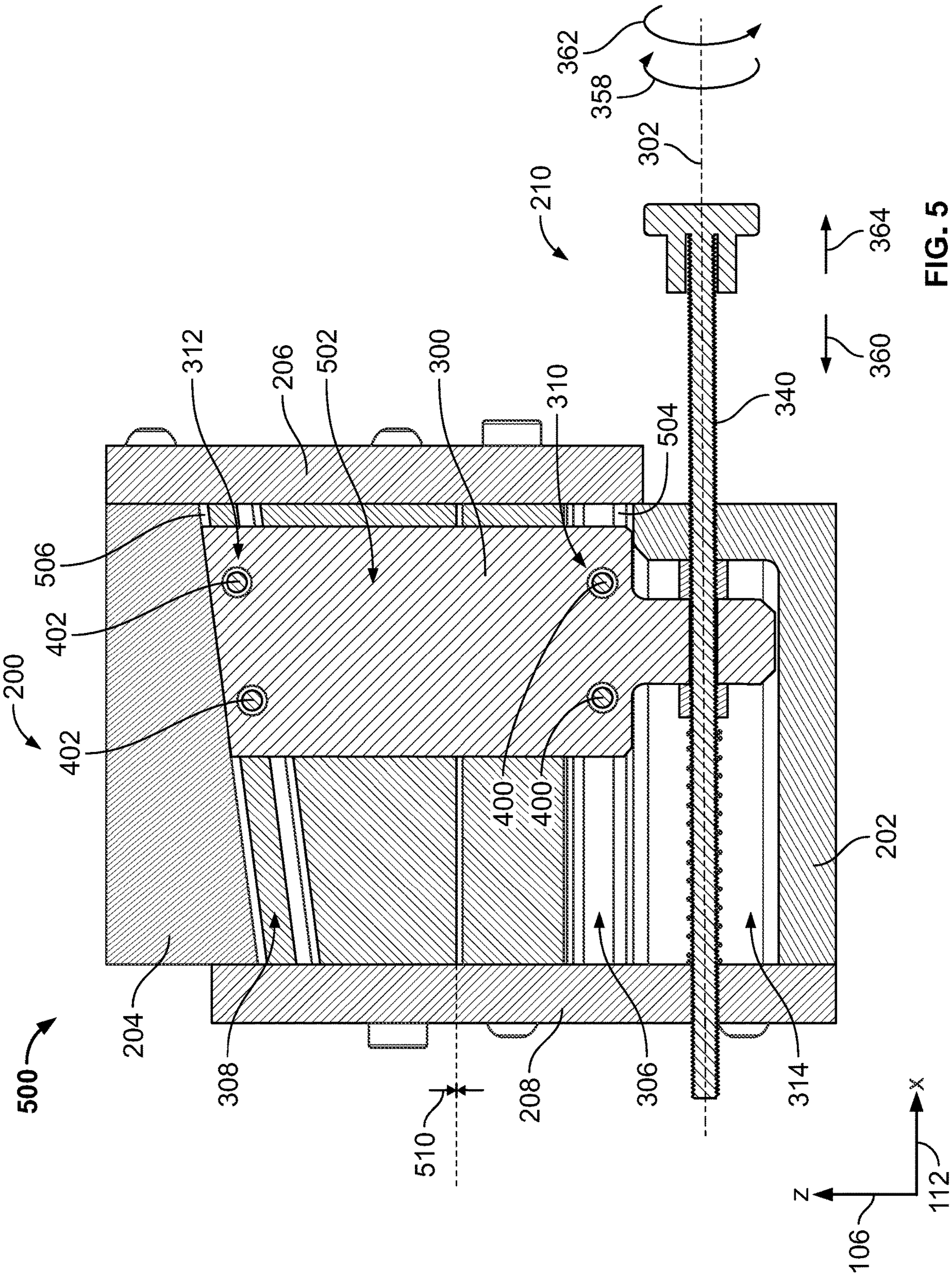
FIG. 5 is a front cross-sectional view of the adjustor assembly taken along line 3-3 of FIG. 2 with the example adjustor assembly in an example first position.

The second stop 430 of the illustrated example includes a base plate slot 438 formed in the base plate 208 and a second shoulder bolt 440. Specifically, the base plate 208 at least partially extends across a portion of the upper housing 204. In the illustrated example, the second shoulder bolt 440 is threadably coupled to a threaded aperture 442 of the upper housing 204 that aligns with the base plate slot 438. A second shank portion 440*a* of the second shoulder bolt 440 is positioned in the base plate slot 438, a second head 440*b* of the second shoulder bolt 440 engages an outer surface 444 of the base plate 208, and a threaded portion 440*c* of the second shoulder bolt 440 is threadably coupled to the threaded aperture 442 of the upper housing 204. The base plate slot 438 has a size (e.g., a distance, a diameter, an opening, etc.) that is greater than a diameter or size of the second shank portion 440*a* of the second shoulder bolt 440. For example, the second shoulder bolt 440 can slide within the base plate slot 438 of the base plate 208 when the upper housing 204 moves between a fully upward position (e.g., FIG. 7) and a fully lowered position (FIG. 5). The base plate slot 438 is positioned above the base plate fasteners 424 of the base 202. Although the cross-sectional view of FIG. 4 shows two apertures and a slot, the base plate 208 of the illustrated example includes four apertures and two slots. The base plate 208 is identical to the upper plate 206 except that the upper plate 206 is inverted or flipped 180 degrees relative to the base plate 208.

Figure 6:
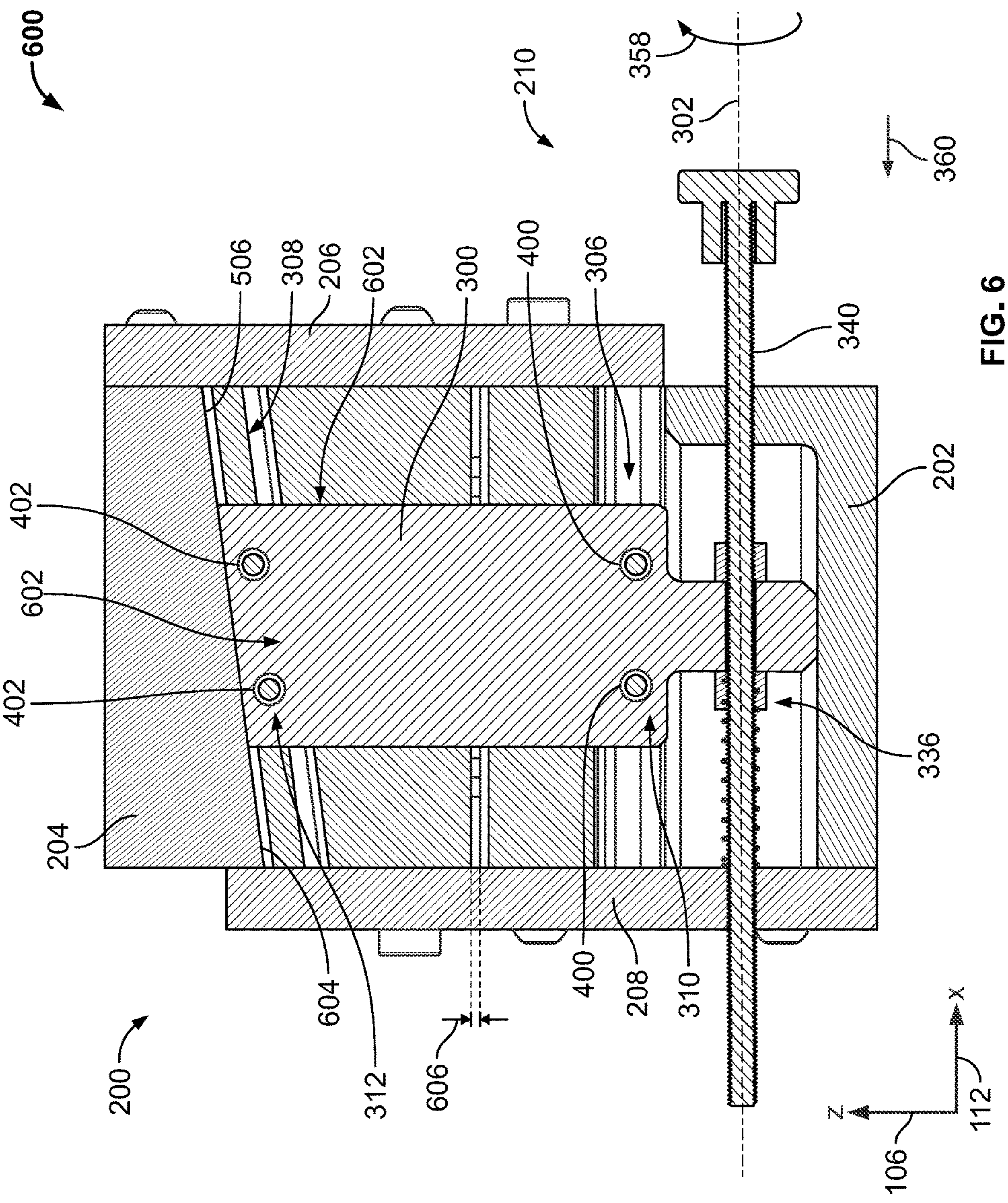
FIG. 6 is a front cross-sectional view of the adjustor assembly taken along line 3-3 of FIG. 2 with the example adjustor assembly in an example second position.
Figure 7:
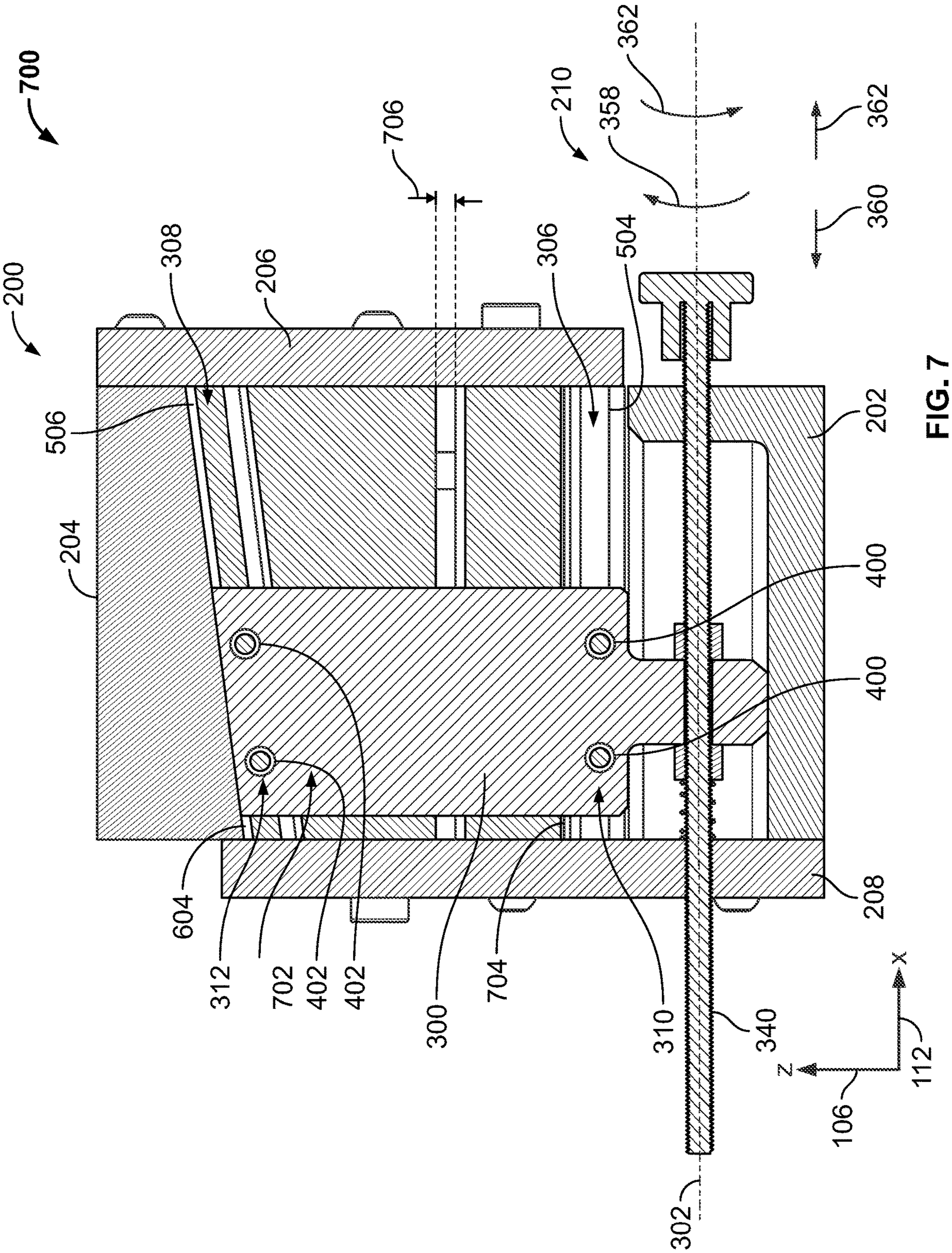
FIG. 7 is a front cross-sectional view of the adjustor assembly taken along line 3-3 of FIG. 2 with the example adjustor assembly in an example third position.

FIGS. 5-7 are cross-sectional views of the adjustor assembly 200 at various operating positions 500-700. FIG. 5 illustrates the adjustor assembly 200 at a first operating position 500 (e.g., a fully lowered position). FIG. 6 illustrates the adjustor assembly 200 at an intermediate operating position 600 (e.g., a nominal position). FIG. 7 illustrates the adjustor assembly 200 at a second operating position 700 (e.g. a fully upward position). The intermediate operating position 600 is between the first operating position 500 of FIG. 5 and the second operating position 700 of FIG. 7.

To move the adjustor assembly 200 in the first linear direction 360 along the drive axis 302 (e.g., from the first operating position 500 of FIG. 5 toward the intermediate operating position 600 of FIG. 6 and/or the second operating position 700 of FIG. 7), the actuator 210 is rotated in the first rotational direction 358 (e.g., a clockwise direction) about the drive axis 302. To move the adjustor assembly 200 in the second linear direction 364 opposite the first linear direction 360 along the drive axis 302 (e.g., from the second operating position 700 of FIG. 7 toward the first operating position 500 of FIG. 5), the actuator 210 is rotated in the second rotational direction 362 (e.g., a counterclockwise direction) about the drive axis 302 of the actuator 210. The screw 340 is threadably coupled to the base 202 and the base plate 208 and the slider 300 is fixed to the screw 340. Thus, rotation of the screw 340 moves the slider 300 in a side-to-side direction along the drive axis 302.

Referring to FIG. 5, the slider 300 is in a first position 502 when the adjustor assembly 200 is in the first operating position 500. For example, the slider 300 of the illustrated example is adjacent or next to the upper plate 206. In this manner, the first track follower 310 or the first rollers 400 are positioned adjacent a first end 504 of the first track 306 and the second track follower 312 or the second rollers 402 are positioned adjacent a first end 506 of the second track 308. The first ends 504, 506 of the first track 306 and the second track 308, respectively, are positioned adjacent to the upper plate 206. In the first operating position 500, the upper housing 204 is not spaced apart from the base 202 and/or a first gap 510 between the upper housing 204 and the base 202 is negligible or zero. For example, in the first operational position 500, the upper housing 204 of the illustrated example directly engages the base 202. To position or move the slider 300 along the drive axis 302 to the first position 502 of FIG. 5, the actuator 210 is rotated (e.g., via the knob) in the second rotational direction 362 (e.g., a counterclockwise direction about the drive axis 302 in the orientation of FIG. 5). Rotation of the actuator 210 in the second rotational direction 362 causes the screw 340 to move in the second linear direction 364 along the drive axis 302, which in turn causes the slider 300 to move in the second linear direction 364.

Referring to FIG. 6, the slider 300 is moved to an intermediate position 602 to move the adjustor assembly 200 to the intermediate operating position 600. For example, the slider 300 is positioned laterally (e.g., at a midpoint) between the upper plate 206 and the base plate 208. In the intermediate position 602, the slider 300 causes the upper housing 204 to move relative to the base 202 to provide a second gap 606 therebetween (e.g., a vertical gap between the upper housing 204 and the base 202). For example, to move the adjustor assembly 200 from the first operating position 500 of FIG. 5 to the intermediate operating position 600 of FIG. 6, the actuator 210 (e.g., the screw) is rotated in the first rotational direction 358 (e.g., a clockwise direction) relative to the drive axis 302. As the screw 340 rotates in the first rotational direction 358, the screw 340 moves the slider 300 via the actuator interface 336 in the first linear direction 360 toward the base plate 208, which in turn causes the slider 300 to move in the first linear direction 360 along the drive axis 302 (e.g., toward the base plate 208). As the slider 300 moves from the first position 502 to the intermediate position 602, the second track follower 312 (e.g., the second rollers 402) moves along the second track 308. Because the slider 300 is fixed relative to the first direction 106 (e.g., the slider 300 cannot move vertically in the orientation of FIG. 6) via the first rollers 400 and/or the first track 306 (e.g., and/or via the slider 300 and the screw 340 connection), the upper housing 204 (e.g., being the only non-fixed structure) moves in the first direction 106 (e.g. upward or vertically in the orientation of FIG. 6) as the second track follower 312 moves along the second track 308 from the first end 506 of the second track 308 toward a second end 604 of the second track 308. Specifically, the angled, tapered or sloped orientation between the tapered surface of the second track 308 and the roller angle 326 of the rollers 402 of the slider 300 causes the upper housing 204 to move in the first direction 106 (e.g., an upward direction in the orientation of FIG. 6) in response to the slider 300 moving laterally in the first linear direction 360 along the drive axis 302. Thus, in the intermediate operating position 600, the upper housing 204 is spaced from the base 202 via the second gap 606. In the illustrated example, the second gap 606 is greater than the first gap 510 when the adjustor assembly 200 is in the first operational position 500 of FIG. 5.

Referring to FIG. 7, in the second operational position 700, the slider 300 is in a second position 702. For example, the slider 300 of the illustrated example is adjacent or next to the base plate 208 in the second position 702. In other words, the first track follower 310 (e.g., the first rollers 400) is positioned adjacent a second end 704 of the first track 306 opposite the first end 504 and the second track follower 312 (e.g., the second rollers 402) is positioned adjacent the second end 604 of the second track 308 opposite the first end 506. To position or move the slider 300 to the second position 702, the actuator 210 is rotated in the first rotational direction 358 about the drive axis 302. Rotation of the actuator 210 in the first rotational direction 358 causes the screw 340 to move in the first linear direction 360 along the drive axis 302, which in turn causes the slider 300 to move in the first linear direction 360 toward and/or to the base plate 208. In the second operational position 700, the upper housing 204 is spaced from the base 202 by a third gap 706. The third gap 706 of the illustrated example is greater than the second gap 606 and the first gap 510. As shown in FIG. 7, the upper housing 204 is spaced apart from the base 202. The second operational position 700 of the illustrated example provides a maximum vertical position of the upper housing 204 relative to the base 202 and the first operational position 500 of FIG. 5 provides a minimum vertical position of the upper housing 204 relative to the base 202. To move the slider 300 and/or the adjustor assembly 200 to the first operational position 500 and/or to the intermediate operational position 600 from the second operational position 700, the actuator 210 is moved or rotated in the second rotational direction 362 to move the slider 300 in the second linear direction 364 along the drive axis 302.

In operation, although the upper plate 206 is not coupled to the base 202, movement of the upper plate 206 relative to the base 202 is limited by the first stop 428 and the second stop 430. For example, at the first operational position 500, a first end of the upper plate slot 432 (FIG. 4) engages the first shoulder bolt 434 (FIG. 4) and a first end of the base plate slot 438 (FIG. 4) engages the second shoulder bolt 440 (FIG. 4). At the second operational position 700, a second end of the upper plate slot 432 (FIG. 4) opposite the first end engages the first shoulder bolt 434 (FIG. 4) and a second end of the base plate slot 438 (FIG. 4) opposite the first end engages the second shoulder bolt 440 (FIG. 4). At the intermediate operational position 600, the first shoulder bolt 434 (FIG. 4) is between first and second ends of the upper plate slot 432 (FIG. 4) and the second shoulder bolt 440 (FIG. 4) is between first and second ends of the base plate slot 438 (FIG. 4).

Figure 8A:
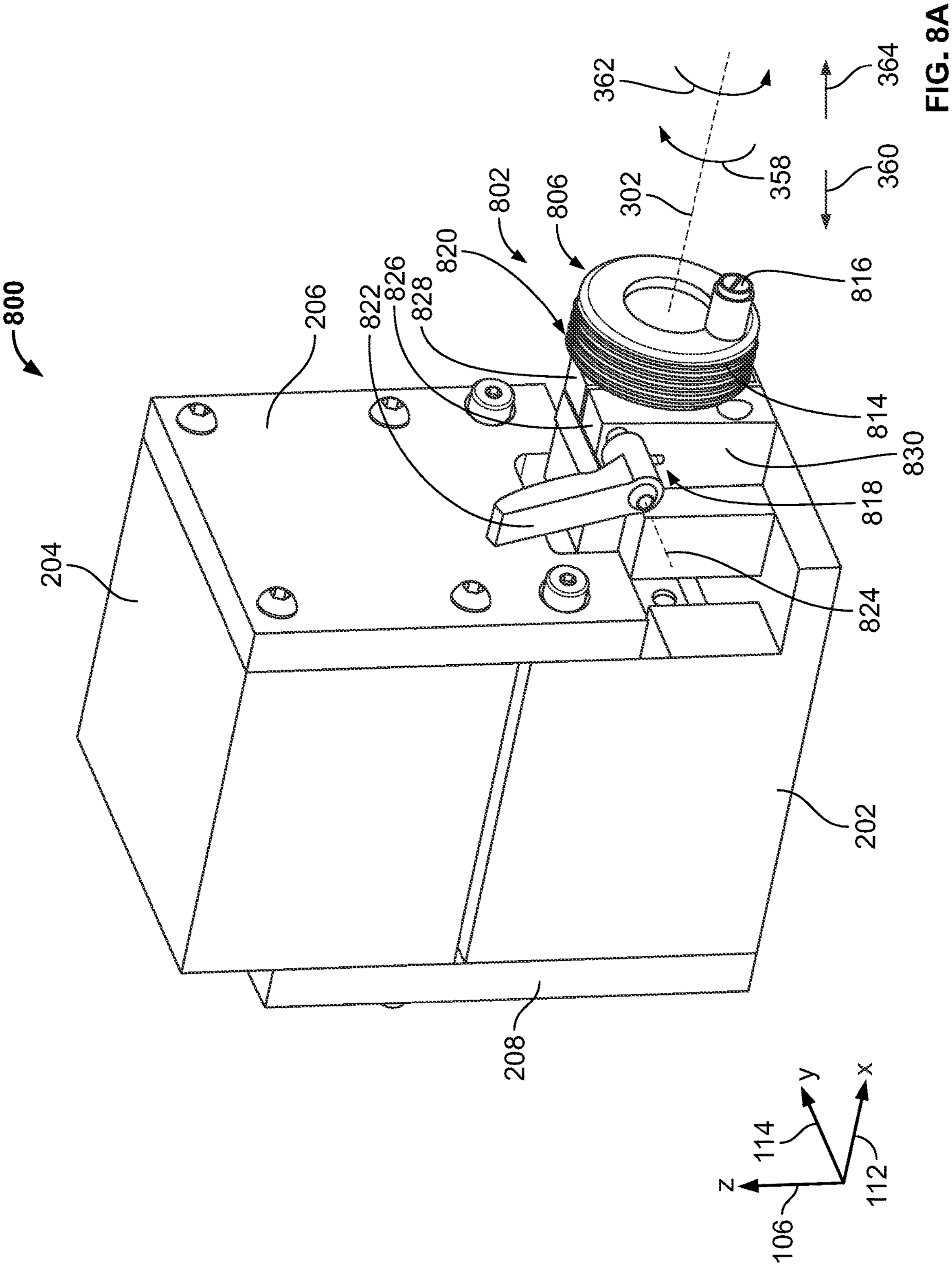
FIG. 8A is a perspective view of another example adjustor assembly disclosed herein that can implement the adjustor apparatus of FIG. 1.
Figure 8B:
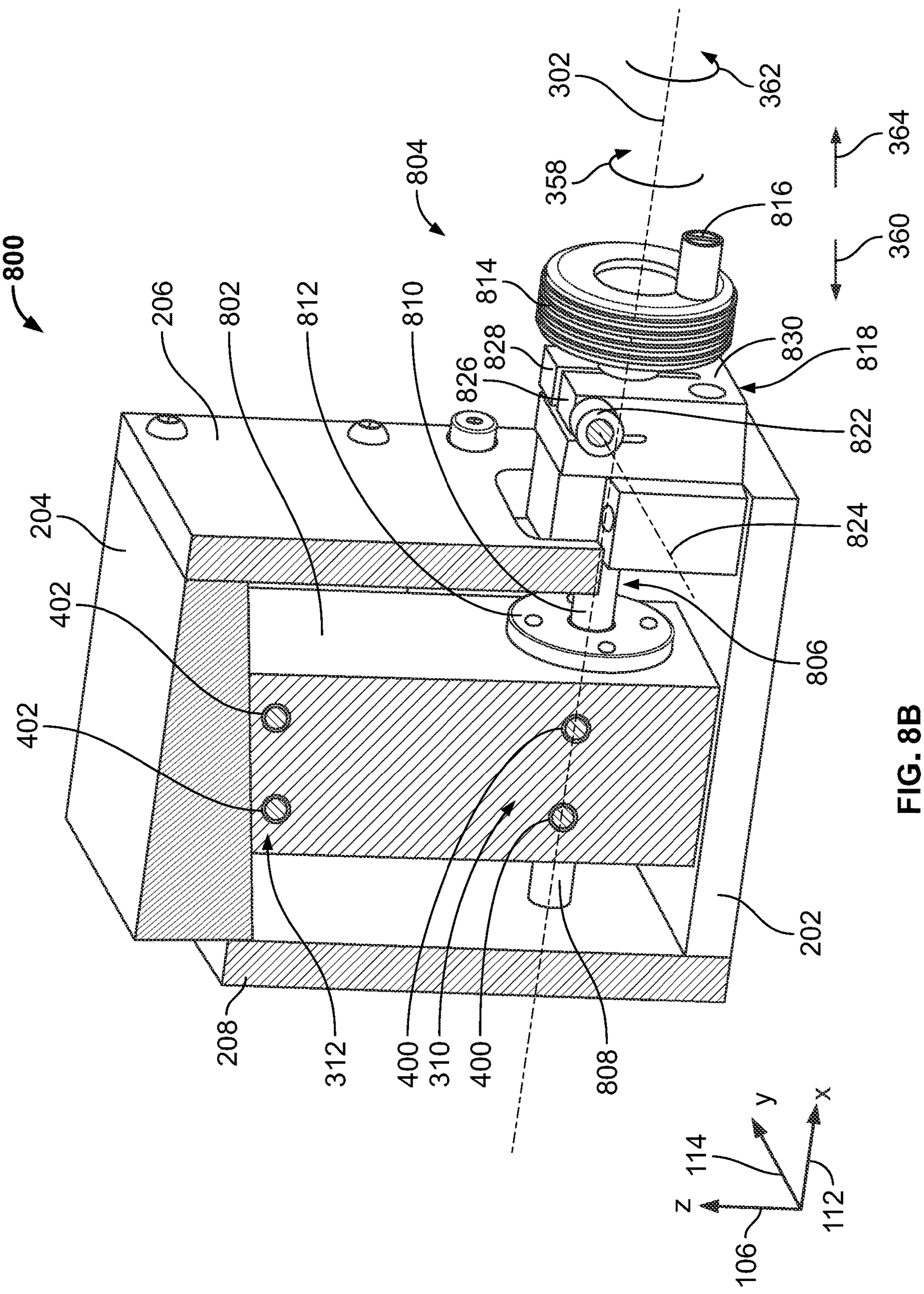
FIG. 8B is a perspective, cutaway view of the example adjustor assembly of FIG. 8A.
Figure 8C:
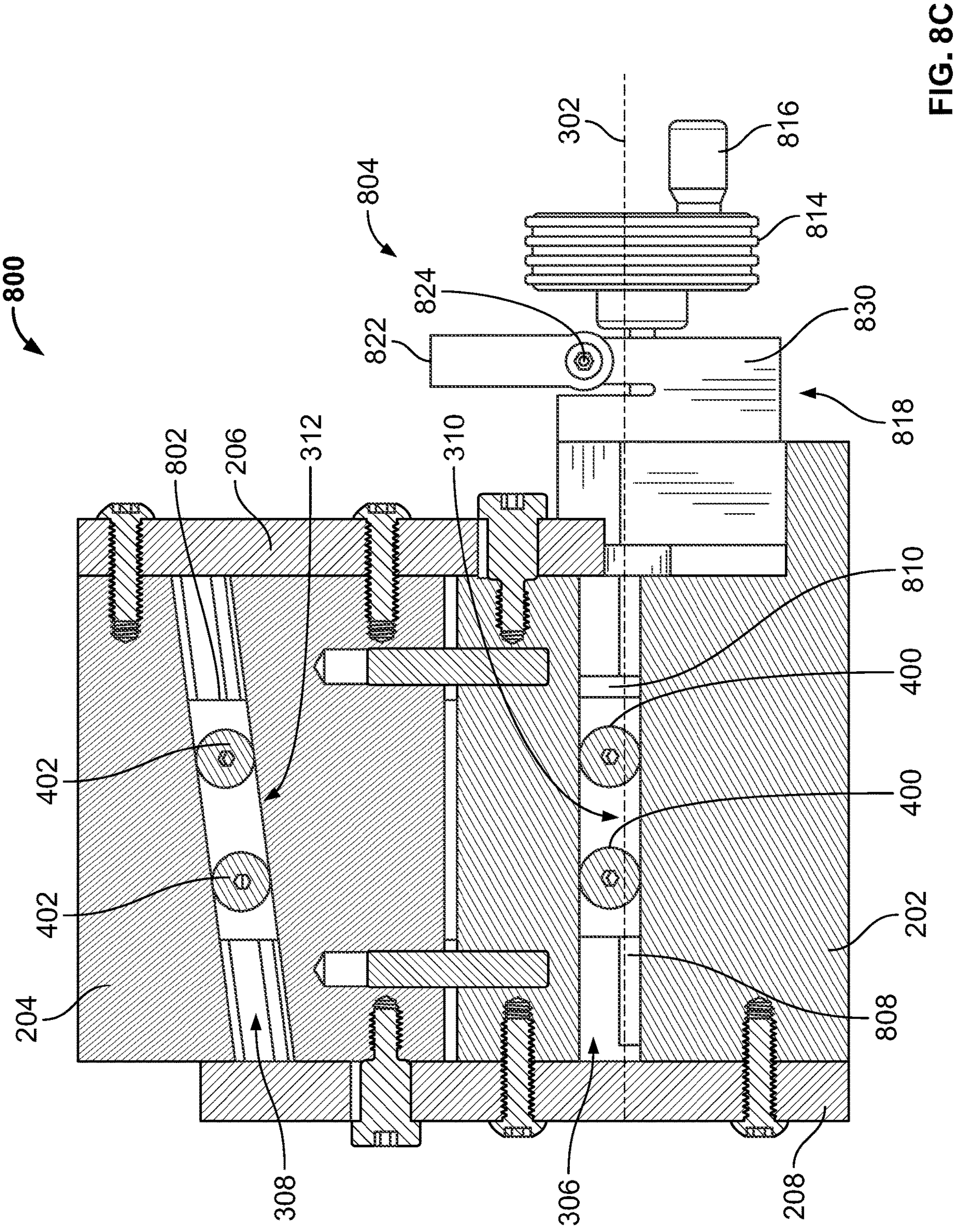
FIG. 8C is a cross-sectional view of the example adjustor assembly of FIG. 8A.

FIG. 8A is a perspective view of another example adjustor assembly 800 disclosed herein that can implement the example adjustor apparatus 100 of FIG. 1. FIG. 8B is a perspective, cross-sectional view of the example adjustor assembly 800 of FIG. 8A. FIG. 8C is a front, cross-sectional view of the example adjustor assembly 800 of FIG. 8A. Many of the components of the example adjustor assembly 800 of FIGS. 8A-8C are substantially similar or identical to the components described above in connection with the example adjustor assembly 200 of FIGS. 2-7. As such, those components will not be described in detail again below. Instead, the interested reader is referred to the above corresponding descriptions for a complete written description of the structure and operation of such components. To facilitate this process, similar or identical reference numbers will be used for like structures as used in FIGS. 1-7 above. For example, the adjustor assembly 800 of FIGS. 8A-8C includes an upper housing 204 (e.g., an adjustable gib), a base 202, an upper plate 206, and a base plate 208. In contrast to the example adjustor assembly 200 described above, the adjustor assembly 800 of FIGS. 8A-8C employs an example slider 802 and an example actuator 804.

The slider 802 of the illustrated example carries a first track follower 310 (e.g., a plurality of first rollers 400) and a second track follower 312 (e.g., a plurality of second rollers 402). The slider 802 is movable along a drive axis 302 via the actuator 804, which causes the upper housing 204 to move relative to the base 202 in a first direction 106 (e.g., a vertical direction in the orientation of FIGS. 8A-8C).

The actuator 804 of the illustrated example includes is an acme screw assembly 806. Specifically, the actuator 804 includes an acme screw shaft 808 (e.g., a screw, a threaded fastener, etc.) and an acme nut 810 (e.g., a threaded nut) that movably couples to the acme screw shaft 808. The acme screw shaft 808 extends between the upper plate 206 and the base plate 208. Additionally, the acme screw shaft 808 passes through the slider 802. The acme nut 810 is coupled to the slider 300 via a flange 812. In the illustrated example, the acme nut 810 and the flange 812 are a monolithic or unitary body. The flange 812 couples to the slider 802 via a plurality of fasteners (e.g., screws, rivets, a weld, etc.). Thus, the slider 802 is fixed to the acme nut 810. In other words, movement of the acme nut 810 relative to the acme screw shaft 808 causes linear translation of the slider 802 along the drive axis 302 between the upper plate 206 and the base plate 208.

In the illustrated example, rotation of the acme screw shaft 808 causes the acme nut 810 to move in a linear direction along the drive axis 302 defined by the actuator 804 and/or the acme screw shaft 808. Specifically, rotation of the acme screw shaft 808 in a first rotational direction 358 (e.g., a clockwise direction) about the drive axis 302 causes the slider 802 to move in a first linear direction 360 along the drive axis 302. Rotation of the acme screw shaft 808 in a second rotational direction 362 (e.g., a counterclockwise direction) about the drive axis 302 causes the slider 802 to move in a second linear direction 364 along the drive axis 302 opposite the first linear direction 360. Thus, rotation of the acme screw shaft 808 in the first rotational direction 358 causes the acme nut 810 and, thus, the slider 802 to move from a first position (e.g., the first position 502 of FIG. 5) adjacent the upper plate 206 toward a second position (e.g., the second position 702 FIG. 7) adjacent the base plate 208. Rotation of the acme screw shaft 808 in the second rotational direction 362 causes the acme nut 810 and, thus, the slider 802 to move from the second position adjacent the base plate 208 toward the first position adjacent the upper plate 206.

To facilitate rotation of the acme screw shaft 808, the actuator 804 of the illustrated example includes a wheel 814. The wheel 814 includes a knob or grip 816 to enable a user to grasp and rotate the acme screw shaft 808 via the grip 816 and the wheel 814. Additionally, to fix a position of the slider 802 along the drive axis 302, the actuator 804 of the illustrated example includes a lock 818. The lock 818 of the illustrated example is a clamp 820 that moves from a release position to enable rotation of the acme screw shaft 808 and a clamped position to prevent rotation of the acme screw shaft 808. The lock 818 includes a lever 822 that pivots about a pivot axis 824 between a first position corresponding to the release position and a second position corresponding to the clamped position. In the release position, a first wing 826 and a second wing 828 of a lock housing 830 of the lock 818 are decompressed to enable rotation of the acme screw shaft 808. In the clamped position, the lever 822 causes the first wing 826 and the second wing 828 to compress, thereby increasing a frictional engagement between the lock housing 830 and the acme screw shaft 808, thereby restricting or preventing rotation of the acme screw shaft 808. In some examples, the actuator 804 can be a linear actuator, a stepper motor, a linear slide and/or any other actuator, motor and/or transmission that converts rotational motion to linear motion that causes linear movement of the slider 802 between the upper plate 206 and the base plate 208.

Figure 9:
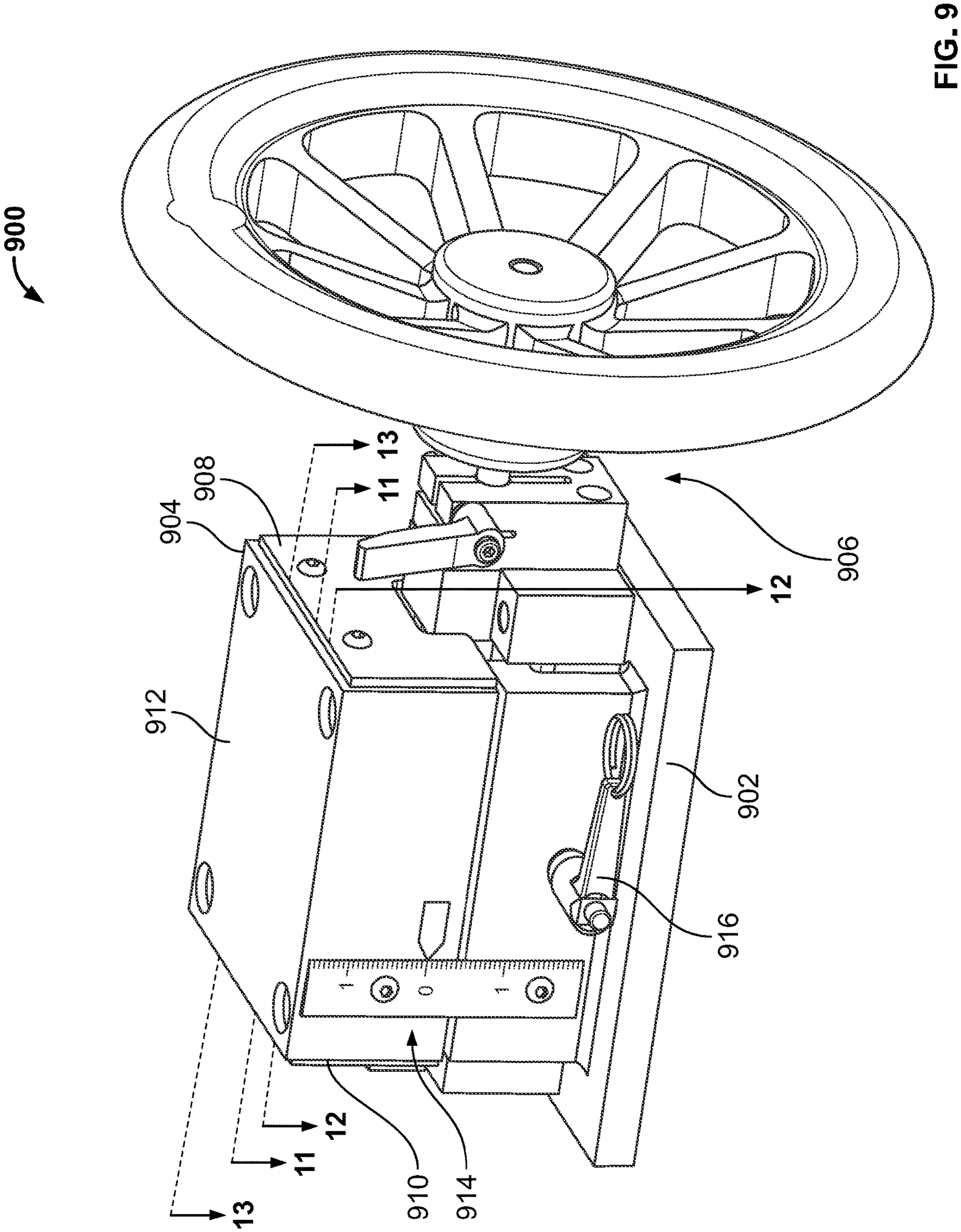
FIG. 9 is a perspective view of another example adjustor assembly disclosed herein.
Figure 10:
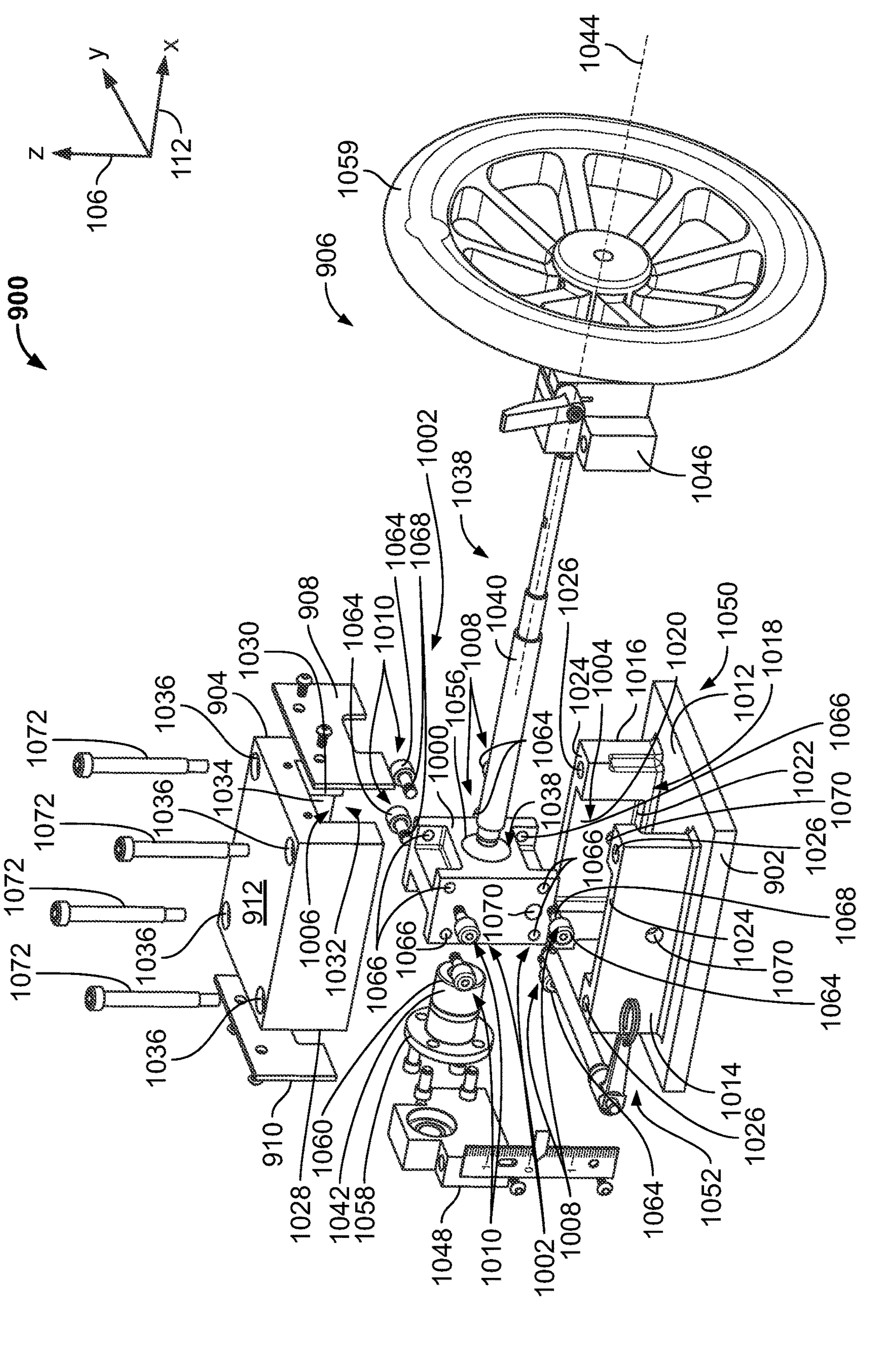
FIG. 10 is an exploded view of the example adjustor assembly of FIG. 9.

FIG. 9 is a perspective view of another example adjustor assembly 900 disclosed herein that can be used to implement the adjustor apparatus 100 of FIG. 1. FIG. 10 is an exploded view of the example adjustor assembly 900 of FIG. 9. The adjustor assembly 900 of FIG. 9 includes a base 902, an upper housing 904 (e.g., an adjustable gib), and an actuator 906. The adjustor assembly 900 of the illustrated example includes a first cover 908 (e.g., a side cover, a plate) and a second cover 910 (e.g., a side cover, a plate). The adjustor assembly 900 of the illustrated example includes a support surface or part interface 912 for receiving, supporting, or attaching a tool (e.g., the first part holder 120 and/or the second part holder 122 of FIG. 1). The adjustor assembly 900 of the illustrated example includes a visual indicator 914 (e.g., a scale or position indicator) to provide an indication of a position of the adjustor assembly 900 in the first direction 106 (e.g., the z-direction or a position between the first operating position 500 and the second operating position 700 of FIGS. 5-7). Additionally, the adjustor assembly 900 includes a pin 916 that couples to the base 902 to provide or set a nominal position (e.g., the intermediate operating position 600 of FIG. 6) of the adjustor assembly 900. The actuator 906 of the illustrated example is operated to move the upper housing 904 relative to the base 902 in the first direction 106 (e.g., the z-direction).

FIG. 10 is an exploded view of the adjustor assembly 900 of FIG. 9. The adjustor assembly 900 of the illustrated example includes a carriage or slider 1000. The slider 1000 of the illustrated example is movable relative to the base 902 and the upper housing 904. Specifically, the slider 1000 is movable relative to the base 902 and the upper housing 904 in a second direction 112 (e.g., a linear direction or side-to-side direction) via the actuator 906. To enable the slider 1000 to move relative to the base 902 and the upper housing 904, the adjustor assembly 900 of the illustrated example includes a track system 1002. The slider 1000 of the illustrated example moves in a horizontal direction or along the second direction 112 (x-direction) in the orientation of FIG. 10 via the track system 1002. The track system 1002 of the illustrated example includes a first track 1004, a second track 1006, a first track follower 1008 and a second track follower 1010.

The first track 1004 is provided (e.g., carried) by the base 902. For example, the base 902 of the illustrated example includes a platform 1012 (e.g., a flange or seating structure) having a first wall 1014 (e.g., a vertical wall) and a second wall 1016 (e.g., a vertical) spaced from the first wall 1014 to define a channel 1018 therebetween. The first wall 1014 and the second wall 1016 protrude (e.g., vertically or in the z-direction) from (e.g., an upper surface) of the base 902. The first wall 1014 and the second wall 1014 each include a recess 1020 defining a support surface 1022. The support surface 1022 of the first wall 1014 and the second wall 1016 define the first track 1004 to receive the first track follower 1008. End surfaces 1024 of the first wall 1014 and the second wall 1016 include a plurality of base apertures 1026. The base apertures 1026 are oriented in the vertical direction or z-direction and extend from the end surfaces 1024 toward the platform 1012 in the orientation of FIG. 10. The support surface 1022 of the first wall 1014 is positioned between a first set of the base apertures 1026 of the first wall 1014 and the support surface 1022 of the second wall 1016 is positioned between a second set of the base apertures 1026 of the second wall 1016. Thus, the first track 1004 is positioned between the base apertures 1026.

The second track 1006 is provided (e.g., carried) by the upper housing 904. For example, the upper housing 904 of the illustrated example includes the part interface 912 (e.g., an upper surface of the upper housing 904), and a first wall 1028 (e.g., a vertical wall) and a second wall 1030 (e.g., a vertical) spaced from the first wall 1028 to define a channel 1032 therebetween. The first wall 1028 and the second wall 1030 protrude from the part interface 912 in a direction toward the base 902. The first wall 1028 and the second wall 1030 each include a recess 1034 defining the second track 1006. The upper housing 904 includes a plurality of upper housing apertures 1036. The upper housing apertures 1036 are oriented in the vertical direction or z-direction in the orientation of FIG. 10 and pass through (e.g., entirely pass through) the upper housing 904. The second track 1006 is positioned between the upper housing apertures 1036 relative to the horizontal or x-direction.

The actuator 906 of the illustrated example includes an acme screw assembly 1038. Specifically, the actuator 906 and/or the acme screw assembly 1038 includes a screw 1040 (e.g., a screw, a threaded fastener, etc.) and a nut 1042 (e.g., a threaded nut) that couples to the screw 1040. For example, the nut 1042 and the screw 1040 provide a lead-screw assembly. The nut 1042 translates (e.g., linearly) along an axis of rotation or drive axis 1044 of the actuator 906 as the nut 1042 is threadably engaged to the screw 1040. In other words, the translational motion of the nut 1042 is provided by rotation of the screw 1040 about the drive axis 1044. The example nut 1042 of the illustrated example can be an anti-backlash nut, a tensioning nut, a ball lock, a follower, a ball nut, a ball lock follower, a sleeve, a slider and/or any other structure, fastener, or follower to convert rotational movement of the screw 1040 into translational movement of the nut 1042.

To rotatably couple the screw 1040 relative to the base 902, the upper housing 904 and/or the slider 1000, the adjustor assembly 900 of the illustrated example includes a first support block 1046 (e.g., a bearing block) and a second support block 1048 (e.g., a bearing block). The first support block 1046 is positioned adjacent the first cover 908 or a first side 1050 of the adjustor assembly 900 and the second support block 1048 is positioned adjacent the second cover 910 or a second side 1052 of the adjustor assembly 900 opposite the first side 1050. Thus, the screw 1040 extends between the first cover 908 and the second cover 910. A first end of the screw 1040 is rotatably coupled or supported by the first support block 1046 and a second end of the screw 1040 opposite the first end is rotatably coupled or supported by the second support block 1048. Thus, the screw 1040 of the illustrated example does not translate in the x-direction and only rotates about the drive axis 1044. Specifically, the screw 1040 passes through a central opening 1056 of the slider 1000 and the nut 1042 couples to the slider 1000 via a flange 1058. A longitudinal axis of the central opening 1056 aligns (e.g., coaxially aligns) with the drive axis 1044. A cylindrical body or barrel 1060 of the nut 1042 threadably couples to the screw 1040 and is received by the central opening 1056. In the illustrated example, the nut 1042 and the flange 1058 are a monolithic or unitary body. The flange 1058 couples to the slider 1000 via a plurality of fasteners (e.g., screws, rivets, a weld, etc.). Thus, the slider 1000 is fixed to the nut 1042 via the flange 1058. In other words, movement of the nut 1042 relative to the screw 1040 causes linear translation of the slider 1000 along the drive axis 1044 between the first cover 908 and the second cover 910. To facilitate rotation of the screw 1040, the actuator 906 of the illustrated example includes a hand wheel 1059. The hand wheel 1059 is coupled to the first end of the screw 1040 and positioned adjacent the first support block 1046. In some examples, the actuator 906 can be a linear actuator, a stepper motor, a linear slide and/or any other actuator, motor and/or transmission that converts rotational motion to linear motion that causes linear movement of the slider 1000 between the first cover 908 and the second cover 910.

The slider 1000 of the illustrated example includes lower flanges to support or carry the first track follower 1008 and upper flanges to support or carry the second track follower 1010. The first track follower 1008 and the second track follower 1010 of the illustrated example include a plurality of rollers 1064. The lower flanges and upper flanges each include a stem aperture 1066 to receive a stem 1068 of the rollers 1064. In the illustrated example, the first track follower 1008 includes a first set of the rollers 1064 to engage with the first wall 1014 of the base 902 of the adjustor assembly 900 and a second set of the rollers 1064 to engage the second wall 1016 of the base 902. Similarly, the second track follower 1010 of the illustrated example includes a first set of the rollers 1064 to engage with the first wall 1028 of the upper housing 904 and a second set of the rollers 1064 to engage with the second wall 1030 of the upper housing 904. In the illustrated example, the adjustor assembly 900 includes four rollers to engage the first track 1004 and four rollers to engage the second track 1006. However, other examples, the adjustor assembly 900 can include one roller, three rollers, eight rollers or any number of rollers to engage the first track 1004 and/or the second track 1006. In the illustrated example, the stem apertures 1066 include longitudinal axes that are non-parallel (e.g., perpendicular) relative to the drive axis 1044. The stems 1068 of the illustrated example include threaded ends to threadably couple to the stem apertures 1066. Additionally, the slider 1000 and the base 902 (e.g., the first and second walls 1014, 1016) include openings 1070 for receiving the pin 916. The openings 1070 have central axes that are non-parallel (e.g., perpendicular) relative to the drive axis 1044.

In response to movement of the slider 1000 along the second direction 112 and/or along the drive axis 1044, the upper housing 904 moves relative to the base 902 in the first direction 106 (e.g., the z-direction). To moveably couple the upper housing 904 relative to the base 902, the adjustor assembly 900 of the illustrated example includes a plurality of fasteners 1072 (e.g., pins, shoulder bolts, etc.). Specifically, the base apertures 1026 align (e.g., coaxially align) with the upper housing apertures 1036 to receive the fasteners 1072 (e.g., shoulder bolts). In the illustrated example, the fasteners 1072 are slidably coupled to the upper housing apertures 1036 and fixed or threaded to the base apertures 1026. For example, the fasteners 1072 are slip fit relative to the upper housing apertures 1036 of the upper housing 904 and press fit and/or threaded relative to the base apertures 1026. In this manner, the upper housing 904 can move (e.g., slide) relative to the fasteners 1072 even though the fasteners 1072 are positioned in the upper housing apertures 1036. Although the upper housing 904 can move relative to the fasteners 1072, the fasteners 1072 remain within the upper housing apertures 1036 as the upper housing 904 moves between a first position (e.g. a maximum vertical distance) and a second position (e.g., a minimum vertical distance) as the slider 1000 moves in an aft/fore direction along the drive axis 1044 between a first lateral position adjacent the first cover 908 and a second lateral position adjacent the second cover 910. The fasteners 1072 remain fixed to the base 902 (e.g., the fasteners 1072 do not move) when the upper housing 904 moves relative to the base 902 and/or the fasteners 1072.

Figure 11:
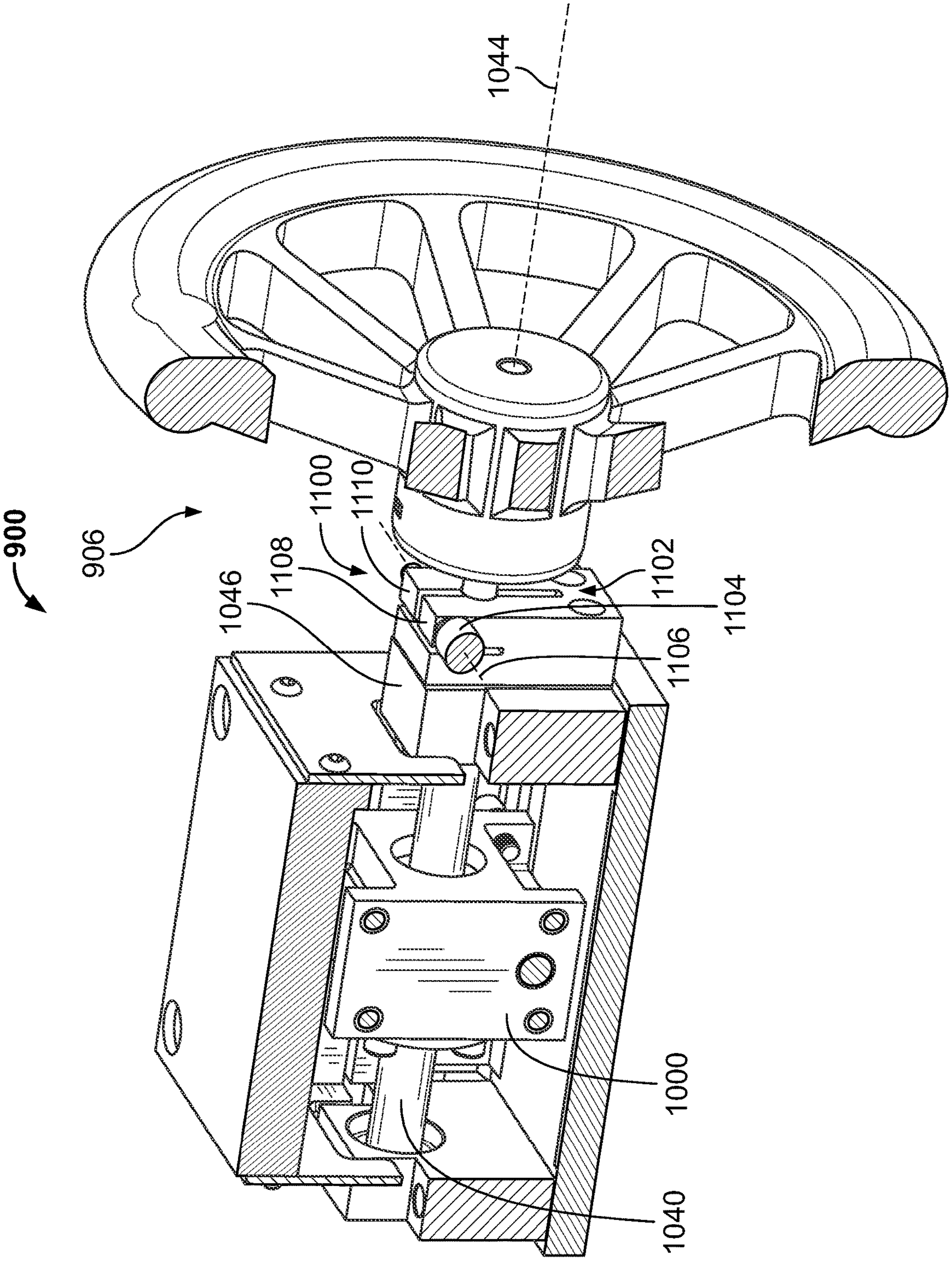
FIG. 11 is a perspective, cross-sectional view of the example adjustor assembly of FIG. 9 taken along line 11-11 of FIG. 9.

FIG. 11 is a perspective, cross-sectional view of the example adjustor assembly 900 taken along line 11-11 of FIG. 9. To prevent rotation of the actuator 906 and/or to lock or fix a position of the slider 1000 along the drive axis 1044, the adjustor assembly 900 of the illustrated example includes a lock 1100. The lock 1100 is positioned adjacent to the first support block 1046. The lock 1100 of the illustrated example is a clamp 1102 that moves from a release position to enable rotation of the screw 1040 and a clamped position to prevent rotation of the screw 1040 about the drive axis 1044. The lock 1100 includes a lever 1104 that pivots about a pivot axis 1106 between a first position corresponding to the release position and a second position corresponding to the clamped position. In the release position, a first wing 1108 and a second wing 1110 of the clamp 1102 are decompressed or move away from each other, thereby reducing a frictional force between the clamp 1102 and the screw 1040 to enable rotation of the screw 1040 about the drive axis 1044. In the clamped position, the lever 1104 causes the first wing 1108 and the second wing 1110 to compress or move toward each other, thereby increasing a frictional force between the clamp 1102 and the screw 1040, thereby restricting or preventing rotation of the screw 1040 relative to the drive axis 1044.

Figure 12:
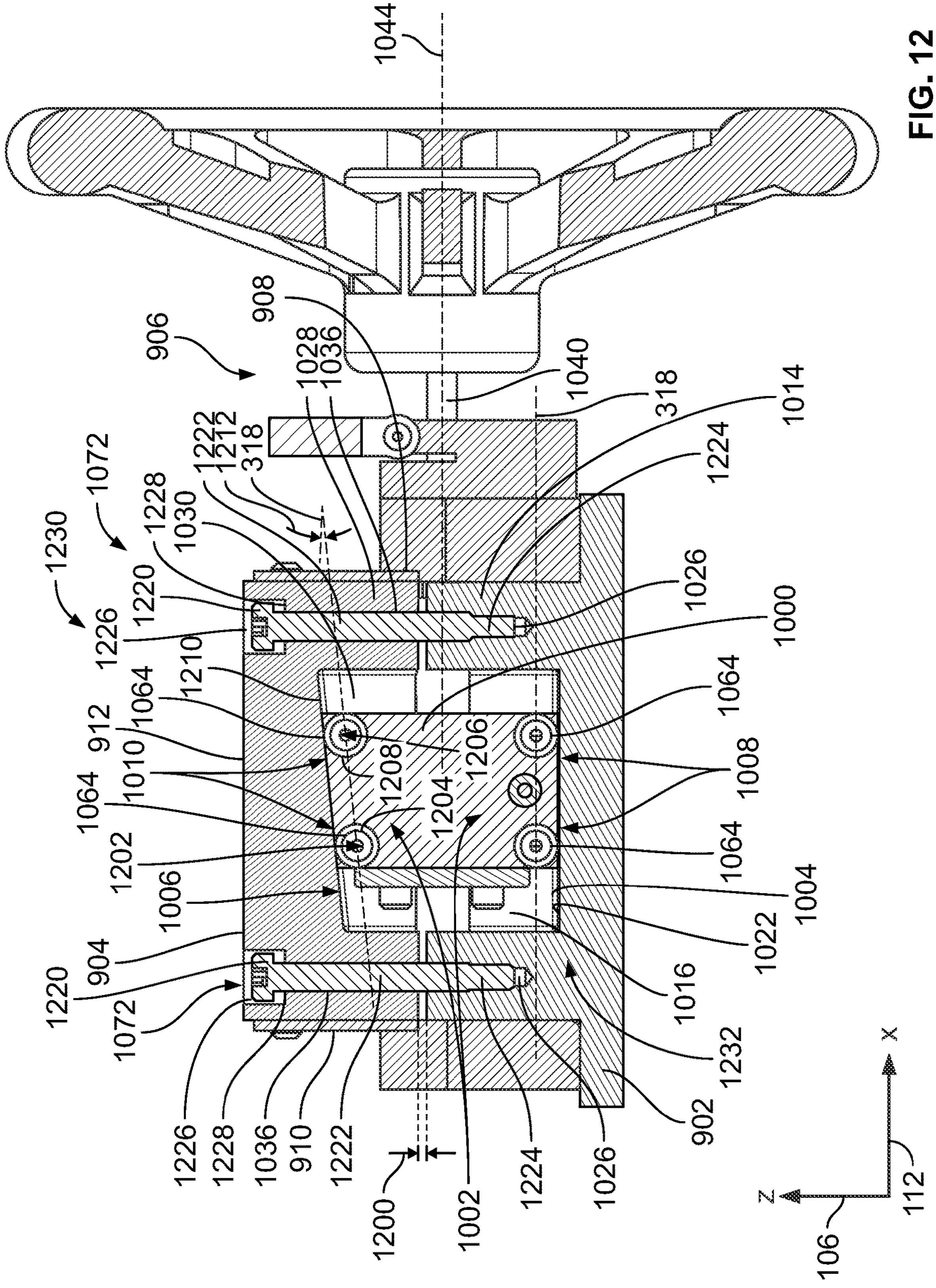
FIG. 12 is a side, cross-sectional view of the example adjustor assembly of FIG. 9 taken along line 12-12 of FIG. 9.

FIG. 12 is a front, cross-sectional view of the example adjustor assembly 900 taken along line 12-12 of FIG. 9. Movement of the slider 1000 in the second direction 112 (e.g., the x-direction) via the actuator 906 causes the upper housing 904 to move relative to the base 902. Specifically, movement of the slider 1000 along the drive axis 1044 causes a gap 1200 (e.g., a vertical gap in the orientation of FIG. 12) between the upper housing 904 and the base 902 to vary or change.

In the illustrated example, the slider 1000 is movably or slidably coupled relative to the upper housing 904 and the base 902 via the actuator 906 and the track system 1002. Specifically, the first track follower 1008 (e.g., the rollers 1064) engages or interfaces with the first track 1004 and the second track follower 1010 (e.g., the rollers 1064) engages or interfaces with the second track 1006. The screw 1040 of the illustrated example is positioned between the first track follower 1008 and the second track follower 1010 in the z-direction.

The rollers 1064 of the first track follower 1008 engage the support surface 1022 provided by the first wall 1014 and the second wall 1016 of the base 902. The rollers 1064 of the first track follower 1008 have rotational axes that are non-parallel (e.g., perpendicular) relative to the drive axis 1044. Additionally, rotational axes of the rollers 1064 of the first track follower 1008 are substantially straight relative to horizontal 318. In other words, the axes of the rollers 1064 of the first track follower 1008 lie on the same vertical plane (e.g., are positioned at the same elevation) in the z-direction.

The rollers 1064 of the second track follower 1010 engage a support surface 1210 provided by each of the first wall 1028 and the second wall 1030 of the upper housing 904. The rollers 1064 of the second track follower 1010 have rotational axes that are non-parallel (e.g., perpendicular) relative to the drive axis 1044. Additionally, rotational axis of the rollers 1064 of the second track follower 1010 are canted relative to horizontal. In other words, the axes of the rollers 1064 of the second track follower 1010 lie in different vertical planes (e.g., different elevations) in the z-direction.

For example, a first axis 1202 of a first roller 1204 and a second axis 1206 of a second roller 1208 are at an angle relative to each other (e.g., relative to horizontal 318). Thus, the first roller 1204 is at a slope relative to the second roller 1208 such that the second roller 1208 is at a higher elevation in the z-direction relative to the first roller 1204.

Additionally, the second track 1006 of the upper housing 904 has a sloped or tapered profile. For example, the support surface 1210 of the second track 1006 is an upper tapered surface (e.g., a sloped surface) that is at an angle 1212 relative to horizontal 318. The angle or sloped profile of the axes of rotation of the rollers 1204, 1208 corresponds (e.g., is complementary or matching) to the angle 1212 of the support surface 1210 and/or the second track 1006. In other words, the angle of the rollers 1204, 1208 is substantially parallel (e.g., perfectly parallel or within 5 degrees of perfectly parallel) to the angle 1212. As described below, the rollers 1064 of the second track follower 1010 remain substantially parallel relative to the support surface 1210 of the second track 1006 and the rollers 1064 of the first track follower 1008 remain substantially parallel relative to the first track 1004 when the slider 1000 moves side-to-side or in a linear direction along the drive axis 1044 in the x-direction between the first cover 908 and the second cover 910. In response to the slider 1000 moving in the x-direction, the angle 1212 of the second track 1006 causes the upper housing 904 to move in the first direction 106 (e.g., the z-direction).

In the illustrated example, the upper housing 904 is moveably coupled relative to the base 902 in the first direction 106 (e.g., the z-direction) via the fasteners 1072 in response to the slider 1000 moving in the x-direction. Specifically, the fasteners 1072 of the illustrated example are shoulder bolts including a head 1220, a shank 1222, and a threaded end 1224. To slidably couple the upper housing 904 relative to the fasteners 1072, the shank 1222 has a diameter that is less than a diameter of the upper housing apertures 1036. Thus, the fasteners 1072 are slidably coupled to the upper housing 904. The threaded end 1224 of the example fasteners 1072 is threadably coupled with the base apertures 1026. In some examples, the threaded end 1224 is not threaded and such non-threaded end of the shoulder bolt can be press fit with the base apertures 1026. Each of the upper housing apertures 1036 includes a countersink bore 1226 adjacent to the part interface 912 to slidably receive the head 1220 of the shoulder bolts. Thus, a shoulder 1228 formed by the countersink bore 1226 forms a stop that engages the head 1220 when the upper housing 904 is in an extended position (e.g., a maximum extended position). In particular, the gap 1200 between the upper housing 904 and the base 902 (e.g., between opposing ends) is at a maximum vertical distance when the head 1220 engages the shoulder 1228 of the countersink bore 1226. When the gap 1200 is zero or negligible (e.g., less than a couple of millimeters), the head 1220 can be flush with a surface of the part interface 912 (e.g., an upper surface of the upper housing 904), can extend from the upper housing 904, or can remain within the countersink bore 1226 of the upper housing 904. In the illustrated example of FIG. 12, the slider 1000 is in an intermediate position 1232 (e.g., a nominal position) and the adjustor assembly 900 is in an intermediate operating position 1230. The intermediate operating position 1230 is between a first operating position (e.g., the first operating position 500 of FIG. 5) in which the slider 1000 is in a first lateral position adjacent the first cover 908 and the gap 1200 is negligible or zero, and a second operating position (e.g., the second operating position 700 of FIG. 7) in which the slider 1000 is in a second lateral position adjacent the second cover 910 and the gap 1200 is at a maximum position.

Figure 13:
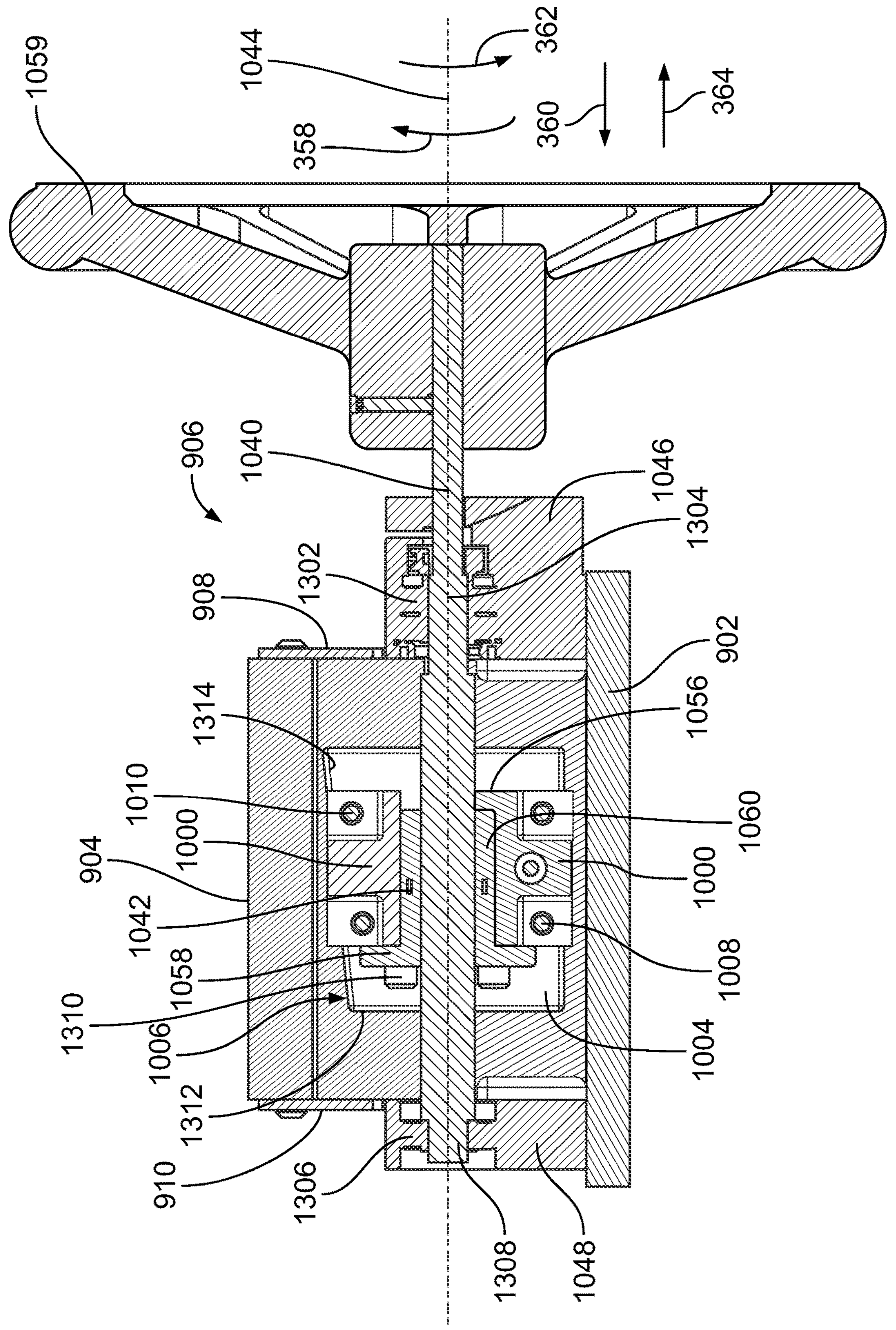
FIG. 13 is a side, cross-sectional view of the example adjustor assembly of FIG. 9 taken along line 13-13 of FIG. 9.

FIG. 13 is a cross-sectional view of the example adjustor assembly 900 taken along line 13-13 of FIG. 9. The first support block 1046 includes a first bearing 1302 to rotatably support a first end 1304 of the screw 1040 and the second support block 1048 includes a second bearing 1306 to rotatably support a second end 1308 of the screw 1040 opposite the first end 1304. In the illustrated example, the first support block 1046 and the second support block 1048 fix the screw 1040 in the second direction 112 (e.g., the x-direction). The nut 1042 is fixed or fastened to the slider 1000 via a plurality of fasteners 1310 received by the flange 1058 and the slider 1000. The barrel 1060 of the nut 1042 is received by the central opening 1056 of the slider 1000. Specifically, the barrel 1060 of the nut 1042 includes an outer surface that engages an inner surface of the central opening 1056. In the illustrated example, the barrel 1060 is slip-fit or press fit relative to the central opening 1056. In some examples, the barrel 1060 is threadably coupled to the central opening 1056 of the slider 1000.

In operation, to adjust the gap 1200 (FIG. 12) between the upper housing 904 and the base 902, the actuator 906 is employed to move the slider 1000 along the drive axis 1044 via the nut 1042 in response to rotation of the screw 1040 about the drive axis 1044 via the hand wheel 1059. Rotation of the actuator 906 moves the slider 1000 in the second direction 112 (e.g., the x-direction) between a first position adjacent the first cover 908 and a second position adjacent the second cover 910. The first track follower 1008 engages the first track 1004 and the second track follower 1010 engages the second track 1006, thereby fixing a position of the slider 1000 in the first direction 106 (e.g., the z-direction). Thus, due to the angle or sloped profile of the support surface 1210 of the second track 1006, the upper housing 904 moves relative to the base 902 when the slider 1000 moves in the second direction 112 (e.g., the x-direction).

In the illustrated example, rotation of the screw 1040 causes the nut 1042 to move in a linear (aft/fore) direction along the drive axis 1044 defined by the actuator 906 and/or the screw 1040. Specifically, rotation of the screw 1040 via the hand wheel 1059 in a first rotational direction 358 (e.g., a clockwise direction) about the drive axis 1044 causes the slider 1000 to move in a first linear direction 360 along the drive axis 1044. Thus, rotation of the screw 1040 in the first rotational direction 358 causes the nut 1042 and, thus, the slider 1000 to move from a first position (e.g., a first position 502 of FIG. 5) adjacent the first cover 908 toward a second position (e.g., a second position 702 FIG. 7) adjacent the second cover 910. In the second position, the gap 1200 between the upper housing 904 and the base 902 is greatest because the rollers 1064 engage a first end 1312 of the second track 1006 adjacent the second cover 910. Because the slider 1000 is fixed in the z-direction, the support surface 1210 of the second track 1006 causes the upper housing 904 to move away from the base 902 as the slider 1000 moves from the first position adjacent the first cover 908 toward the second position adjacent the second cover 910. In some examples, the rollers 1064 can support a load imparted to the adjustor assembly 900 (e.g., when a part is coupled to an adjustment assembly 100 of FIG. 1).

Rotation of the screw 1040 in a second rotational direction 362 (e.g., a counterclockwise direction) about the drive axis 1044 causes the slider 1000 to move in a second linear direction 364 along the drive axis 1044 opposite the first linear direction 360. Rotation of the screw 1040 in the second rotational direction 362 causes the nut 1042 and, thus, the slider 1000 to move from the second position adjacent the second cover 910 toward the first position adjacent the first cover 908. In the first position, the gap 1200 between the upper housing 904 and the base 902 is negligible or zero because the rollers 1064 engage a second end 1314 of the second track 1006 adjacent the first cover 908. Because the slider 1000 is fixed in the z-direction, the support surface 1210 of the second track 1006 causes the upper housing 904 to move toward the base 902 as the slider 1000 moves from the second position adjacent the second cover 910 toward the first position adjacent the first cover 908. The scale (FIG. 10) provides a visual indicator of a position of the upper housing 904 relative to the base 902 (e.g., corresponding to the gap 1200). Thus, adjustment of the gap 1200 can be facilitated by the visual indicator when rotating the hand wheel 1059.

Although each adjustor assembly 116, 118, 200, 800, 900 disclosed above has certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified herein.

Example methods, apparatus, systems, and articles of manufacture for Adjustment apparatus for precision alignment between aircraft components are disclosed herein. Further examples and combinations thereof include the following:

Example 1 includes an adjustor assembly including a base including a first track, an upper housing including a second track, a slider movably coupled relative to the first track and the second track, and an actuator to move the slider in a linear direction, where movement of the slider between a first position and a second position along the first track and the second track is to cause the upper housing to move between a first operating position and a second operating position relative to the base.

Example 2 includes the adjustor assembly of example 1, where the adjustor assembly further includes an upper plate coupled to the upper housing.

Example 3 includes the adjustor assembly of example 1 or 2, where the adjustor assembly includes a stop to restrict movement of the upper housing between the first operating position and the second operating position.

Example 4 includes the adjustor assembly of any one of examples 1-3, where the stop includes a shoulder bolt threadably coupled to the base, the shoulder bolt extending through a slot of the upper plate.

Example 5 includes the adjustor assembly of any one of examples 1-4, where the slot has an opening that is larger than a diameter of a shank of the shoulder bolt passing through the slot of the upper plate.

Example 6 includes the adjustor assembly of any one of examples 1-5, where the second track has a longitudinal axis that is at an angle relative to a longitudinal axis of the first track.

Example 7 includes the adjustor assembly of any one of examples 1-6, where the adjustor assembly further includes an upper plate coupled to the upper housing and a base plate coupled to the base.

Example 8 includes the adjustor assembly of any one of examples 1-7, where the upper plate is to extend at least partially across the base and the base plate is to extend at least partially across the upper housing.

Example 9 includes the adjustor assembly of any one of examples 1-8, the actuator includes a threaded screw coupled to the upper plate, the slider, and the base plate, wherein the slider is fixed to a shaft of the threaded screw via a plurality of nuts.

Example 10 includes the adjustor assembly of any one of examples 9, where rotation of the threaded screw relative to the upper plate and the base plate causes the threaded screw to move linearly relative to the upper plate and the base plate and carry the slider between a first position and a second position.

Example 11 includes the adjustor assembly of any one of examples 10, where the actuator includes a threaded screw and a nut follower threadably coupled to the threaded screw, wherein the slider is fixed to the nut follower.

Example 12 includes the adjustor assembly of any one of examples 10, rotation of the threaded screw causes the nut follower to move along a linear axis relative to a first side plate and a second side plate.

Example 13 includes an adjustor assembly including a base, an upper housing slidably coupled to the base, a slider slidably coupled to the upper housing and the base, the slider to move in a linear direction between a first side plate and a second side plate, and an actuator to move the slider between the first side plate and the second side plate along a drive axis of the actuator, the slider configured to cause the upper housing to move between a first operating position when the slider is in a first position adjacent the first side plate and a second operating position when the slider is in a second position adjacent the second side plate.

Example 14 includes the adjustor assembly of example 13, where the upper housing engages the base when the slider is in the first position, and wherein the upper housing is spaced apart from the base to form a gap between the upper housing and the base when the slider is in the second position.

Example 15 includes the adjustor assembly of example 13 or 14, where the gap is a vertical gap.

Example 16 includes the adjustor assembly of any one of examples 13-15, further including a plurality of pins, wherein respective first ends of the pins are slip fit relative to corresponding first openings of the upper housing and respective second ends of the pins are press fit relative to corresponding second openings of the base, wherein respective ones of the first openings coaxially align with corresponding respective ones of the second openings.

Example 17 includes the adjustor assembly of any one of examples 13-16, where the actuator is at least one of a threaded rod or an acme screw assembly.

Example 18 includes an adjustor assembly including a base defining a first track, a base plate coupled to a first side of the base, an adjustable gib slidably coupled to the base, the adjustable gib defining a second track, the second track including a tapered profile, a gib plate coupled to a second side of the adjustable gib opposite the first side, a slider movably coupled to the first track and the second track between a first position and a second position, the slider including a tapered upper edge having a tapered profile that is complementary to a tapered profile of the second track, and an actuator coupled to the slider, the actuator rotatable in a first rotational direction to move the slider in a first linear direction and a second rotational direction to move the slider in a second linear direction opposite the first linear direction, wherein movement of the slider between the first position and the second position via the actuator causes a change of a gap between the base and the adjustable gib.

Example 19 includes the adjustor assembly of example 18, further including a plurality of pins to guide a position of the adjustable gib relative to the base, respective first ends of the pins being press fit within respective openings of the base and respective second ends of the pins being slip fit within respective openings of the adjustable gib.

Example 20 includes the adjustor assembly of example 18 or 19, where the actuator includes a threaded screw shaft and a nut follower, the nut follower fixed to the slider and the threaded screw shaft.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. An adjustor assembly comprising:

a base including a first track;

an upper housing including a second track;

a slider movably coupled relative to the first track and the second track; and an actuator to move the slider in a linear direction, movement of the slider between a first position and a second position along the first track and the second track to cause the upper housing to move between a first operating position and a second operating position relative to the base.

2. The adjustor assembly of claim 1, wherein the adjustor assembly further includes an upper plate coupled to the upper housing.

3. The adjustor assembly of claim 2, wherein the adjustor assembly includes a stop to restrict movement of the upper housing between the first operating position and the second operating position.

4. The adjustor assembly of claim 3, wherein the stop includes a shoulder bolt threadably coupled to the base, the shoulder bolt extending through a slot of the upper plate.

5. The adjustor assembly of claim 4, wherein the slot has an opening that is larger than a diameter of a shank of the shoulder bolt passing through the slot of the upper plate.

6. The adjustor assembly of claim 1, wherein the second track has a longitudinal axis that is at an angle relative to a longitudinal axis of the first track.

7. The adjustor assembly of claim 1, wherein the adjustor assembly further includes an upper plate coupled to the upper housing and a base plate coupled to the base.

8. The adjustor assembly of claim 7, wherein the upper plate is to extend at least partially across the base and the base plate is to extend at least partially across the upper housing.

9. The adjustor assembly of claim 7, wherein the actuator includes a threaded screw coupled to the upper plate, the slider, and the base plate, wherein the slider is fixed to a shaft of the threaded screw via a plurality of nuts.

10. The adjustor assembly of claim 9, wherein rotation of the threaded screw relative to the upper plate and the base plate causes the threaded screw to move linearly relative to the upper plate and the base plate and carry the slider between a first position and a second position.

11. The adjustor assembly of claim 1, wherein the actuator includes a threaded screw and a nut follower threadably coupled to the threaded screw, wherein the slider is fixed to the nut follower.

12. The adjustor assembly of claim 11, wherein rotation of the threaded screw causes the nut follower to move along a linear axis relative to a first side plate and a second side plate.

13. An adjustor assembly including:
- a base;
- an upper housing slidably coupled to the base;
- a slider slidably coupled to the upper housing and the base, the slider to move in a linear direction between a first side plate and a second side plate; and
- an actuator to move the slider between the first side plate and the second side plate along a drive axis of the actuator, the slider configured to cause the upper housing to move between a first operating position when the slider is in a first position adjacent the first side plate and a second operating position when the slider is in a second position adjacent the second side plate.

14. The adjustor assembly of claim 13, wherein the upper housing engages the base when the slider is in the first position, and wherein the upper housing is spaced apart from the base to form a gap between the upper housing and the base when the slider is in the second position.

15. The adjustor assembly of claim 14, wherein the gap is a vertical gap.

16. The adjustor assembly of claim 13, further including a plurality of pins, wherein respective first ends of the pins are slip fit relative to corresponding first openings of the upper housing and respective second ends of the pins are press fit relative to corresponding second openings of the base, wherein respective ones of the first openings coaxially align with corresponding respective ones of the second openings.

17. The adjustor assembly of claim 13, wherein the actuator is at least one of a threaded rod or an acme screw assembly.

18. An adjustor assembly comprising:
- a base defining a first track;
- a base plate coupled to a first side of the base;
- an adjustable gib slidably coupled to the base, the adjustable gib defining a second track, the second track including a tapered profile;
- a gib plate coupled to a second side of the adjustable gib opposite the first side;
- a slider movably coupled to the first track and the second track between a first position and a second position, the slider including a tapered upper edge having a tapered profile that is complementary to a tapered profile of the second track; and
- an actuator coupled to the slider, the actuator rotatable in a first rotational direction to move the slider in a first linear direction and a second rotational direction to move the slider in a second linear direction opposite the first linear direction, wherein movement of the slider between the first position and the second position via the actuator causes a change of a gap between the base and the adjustable gib.

19. The adjustor assembly of claim 18, further including a plurality of pins to guide a position of the adjustable gib relative to the base, respective first ends of the pins being press fit within respective openings of the base and respective second ends of the pins being slip fit within respective openings of the adjustable gib.

20. The adjustor assembly of claim 18, wherein the actuator includes threaded screw shaft and a nut follower, the nut follower attached to the slider and threadably coupled to the threaded screw shaft.

* * * * *